United States Patent [19]

Lederman

[11] Patent Number: 5,448,625
[45] Date of Patent: Sep. 5, 1995

[54] TELEPHONE ADVERTISING METHOD AND APPARATUS

[75] Inventor: Matthew Lederman, New York, N.Y.

[73] Assignee: MSI Electronics Inc., Long Island City, N.Y.

[21] Appl. No.: 46,418

[22] Filed: Apr. 13, 1993

[51] Int. Cl.⁶ .................... H04M 15/06; H04M 1/64
[52] U.S. Cl. ........................ 379/67; 379/88; 379/112; 379/114; 379/115
[58] Field of Search .............. 379/72, 84, 87, 67, 379/88, 89, 112, 207, 114, 115

[56] References Cited

U.S. PATENT DOCUMENTS

| | | | |
|---|---|---|---|
| 3,714,575 | 1/1973 | Rogalski | 455/57.1 |
| 3,825,947 | 7/1974 | Rubin et al. | 360/12 |
| 4,694,483 | 9/1987 | Cheung | 379/164 X |
| 4,850,007 | 7/1989 | Marino et al. | 379/84 X |
| 4,943,995 | 7/1990 | Daudelin et al. | 379/84 X |
| 5,007,077 | 4/1991 | Fields et al. | 379/143 X |

FOREIGN PATENT DOCUMENTS 58-187056  11/1983  Japan .................... 379/69

*Primary Examiner*—James L. Dwyer
*Assistant Examiner*—Daniel S. Hunter

[57] ABSTRACT

A method and apparatus for routing a telephone call through a telephone network from a caller to a called party designated by the caller via advertising service apparatus that operates in two modes successively, the parties being in communication with each other in one mode and ads are selected from storage during that mode and the ads are impressed on one or both of the parties during a different mode. Selection of ad messages for use is controlled by many criteria. Delivery of ad is recorded for accounting purposes. The modes may alternate between message intervals whose duration is determined by ad message length and communication intervals whose length is determined by a talking time timer.

3 Claims, 16 Drawing Sheets

TELEPHONE ADVERTISING METHOD AND APPARATUS

BACKGROUND OF THE INVENTION

1. Field of the Invention

The invention relates to telephone systems, and to the dissemination of advertisements via telephone systems.

2. Description of Related Art

The established media for disseminating advertisements are experiencing declining audience and effectiveness. In commercial television, remote control devices and cable television systems with many channels have created a phenomenon called "channel surfing," in which viewers immediately switch channels when an advertisement comes on and continue switching until a channel without a commercial is found, making the audience for commercials smaller. Furthermore, the popularity of video cassette recorders has given increased numbers of television viewers the ability to record programs and then "zap" or "fast-forward" past the advertisements when these recorded programs are replayed, making the audience for commercials still smaller.

Advertisers have traditionally been concerned with quantifying the audience that their advertisements reach. The audience of electronic advertising media is presently calculated by measuring or surveying a small sample of the potential population and extrapolating the result of that measurement to the general population.

Telephone systems have been extensively used for telemarketing, in which the telephone is used for high-pressure "boiler-room" sales. The abuse of telemarketing has already resulted in Federal legislation aimed at curbing some of the more offensive telemarketing practices. Marketers who have relied in the past on telemarketing need new strategies to continue using the telephone as a marketing tool.

Telephone systems have been adapted to serve many purposes that are in some way related to commercial messages. For example, U.S. Pat. No. 3,614,328 describes an Automatic Subscriber Answering Service in which a caller, once connected to the service, can supply additional digits by use of the telephone dial or keypad and be provided with information on the goods and services associated with the digits provided. In U.S. Pat. No. 4,757,267, a system is described in which a caller seeking product or service information can be automatically connected to a dealer, agent or distributor who furnishes such products or services. The systems described in the aforementioned patents require the caller to initiate the request for specific marketing information by calling the service and then additionally by providing additional digits if necessary.

Computer-based telephone voice messaging systems are also currently used to deliver electronic "classified" advertisements ranging from apartment rentals to personals. The delivery of these advertisements is also initiated and selected by the calling party.

Telephone systems commonly are equipped to provide messages to parties "on hold." When a telephone call is placed on hold in these systems, a recording of music or an announcement or an advertisement is switched onto the held line, either at the start of the recording or at some intermediate point of the recording. At the end of the hold period, the recording is disconnected without regard to the completion of the inserted message.

Telephone systems commonly are equipped to intercept incoming calls and provide messages to callers before routing the call to either a human or automated attendant. When the incoming telephone call is received in these systems, a recorded announcement or advertisement is switched onto the incoming line. At the end of the message, the recording is disconnected and the call is routed further.

U.S. Pat. No. 5,127,004 relates to voice messaging and tone synthesis as used in telephone routing systems. Tones are used in many telephone systems to transmit routing information from one point to another. Tones are also used to transmit information on the status of a call back in the direction the call was initiated. Recorded voices have long been used to impart information to a caller in a telephone system. Computer technology is now replacing the analog equipment originally used to implement these features. This patent involves computer-based voice and tone response to caller actions, such as pressing the numbers on the telephone keypad, or system events, such as an operator intercept when an unreachable or "disconnected" number has been dialed.

SUMMARY OF THE INVENTION

An object of this invention is to provide novel telephone systems, for use with both local and toll call service, primarily adapted to disseminate advertisements. A related object of this invention is to provide advertisers with a novel effective medium for delivering their advertisements.

A further object of this invention is to provide advertisers with a very accurate count of the audience for their advertisements and to provide a novel advertising medium that accurately accounts for the exposure of each of multiple advertisements.

The present invention provides telephone subscribers and users with an alternative to the customary system for callers to reach called parties. Advertisement distribution apparatus is provided through which a caller can reach a called party designated by the calling party. The time of the call is divided between one mode in which the parties are in communication with each other and a different mode in which the communication is interrupted and messages selected by the ad service apparatus are "played" or "delivered" or "inserted" to the parties on the call. The mode in which the parties are in communication with each other will be referred to in the following as the "communication" or "talking time" interval. The mode in which ad messages are delivered will be referred to in the following as the "message" interval. During any telephone call, there are one or multiple back-and-forth mode changes between conversation or other communication and ad insertion. One or both of the parties receive the same inserted message during any one message interval. Alternatively, one or both of the parties receive different messages during any one message interval.

There is an inducement for a caller to place calls via an advertising service; the advertising service bears some or all of the cost of the call. The cost is recouped by the advertising service from the advertisers.

It is contemplated that a new telephone advertising service company will establish a call distributing network, preferably but not necessarily in the existing telephone system. This network may take various forms. For example, the ad service company may operate in a similar manner to one of the present competing long distance common carriers. Suitable arrangements may be made between the local telephone company, the owner of the long distance network and the new ad service company. Then, when a subscriber of a local telephone company dials "1" or another suitable access code, that subscriber's telephone will be connected via the local exchange to an ad service apparatus, and the ad service apparatus will then route the call into the telephone network, ultimately to be routed to the telephone designated by the caller.

As an alternative, the ad service company may make arrangements for a toll-free "800" number or series of "800" numbers to be used in very nearly the same manner. The caller would dial the "800" number, reaching the ad service apparatus, and then provide the ad service with the number of the called party and, from that point, the ad service apparatus would route the call to the party designated by the calling party.

In concept, the invention is amenable to use within the area of a single local exchange. However, the greatest appeal is for a caller to be able to make a toll call at reduced or no cost, which will involve a long distance network. Ad service apparatus would be provided for routing calls to the long distance network and additional ad service routing means would route the call from the long distance network, ultimately to reach the called party's telephone. A comprehensive system would ordinarily have ad service routing means connected between each local exchange and a point-of-presence of the long distance network in each local area.

In addition to equipment implementing the routing function, some or all of the ad service apparatuses would include ad insertion equipment. That equipment would perform additional functions, basically including the function of switching a call between one mode in which communication between the parties is established and a different mode in which the party-to-party communication is interrupted and a message or messages is inserted. In the course of an extended call there will be one or more repeated reversals from each mode to the other. The ad insertion equipment stores multiple messages, notably including advertisers' "ad sponsor" messages. The ad insertion equipment contains ad selection means, regulated in accordance with various criteria, that select one or more messages to be played during the next "different" mode of operation. The ad insertion equipment also contains accounting means that accumulates the usage of each message, either in terms of the number of times that each message is used or the total time elapsed during use of each message, for one or many calls over a period of time that may be long. This provides a precise basis for billing and this is also able to provide each advertiser with a large amount of data related to the actual dissemination of each message. As one of the many criteria used in message selection, an introductory message of the ad service company is optionally inserted as the first message on each call, to explain the interruptions to the called party. As another criterion, selection of any message is limited to one insertion of any particular ad in each telephone call. The alternative is not to avoid duplicating any message during any one telephone call. The same message is played on the calling party's channel and the called party's channel simultaneously or different messages can be played on the calling party's channel and the called party's channel.

In some of the more detailed aspects of this invention, the ad insertion equipment selects, automatically, those advertisements that are most appropriate to particular areas, based on demographic or other considerations, or based on time-of-day or specific dates, or based on various other considerations such as the frequency of exposure of each advertisement in relation to that of another advertisement or other advertisements. Called numbers are screened to reject certain numbers (such as "900" area codes) and to activate a special response to the calling party if the called number is invalid for any reason. The date and time of delivery of each ad message are recorded. Ad messages are selected automatically for delivery in specified geographic locations and at specified times. Ad messages are also automatically selected based on the number of instances or on the aggregate time that any particular ad message has been delivered in relation to other ad messages in the system.

DETAILED DESCRIPTION OF THE ILLUSTRATIVE EMBODIMENT

Figure 1:
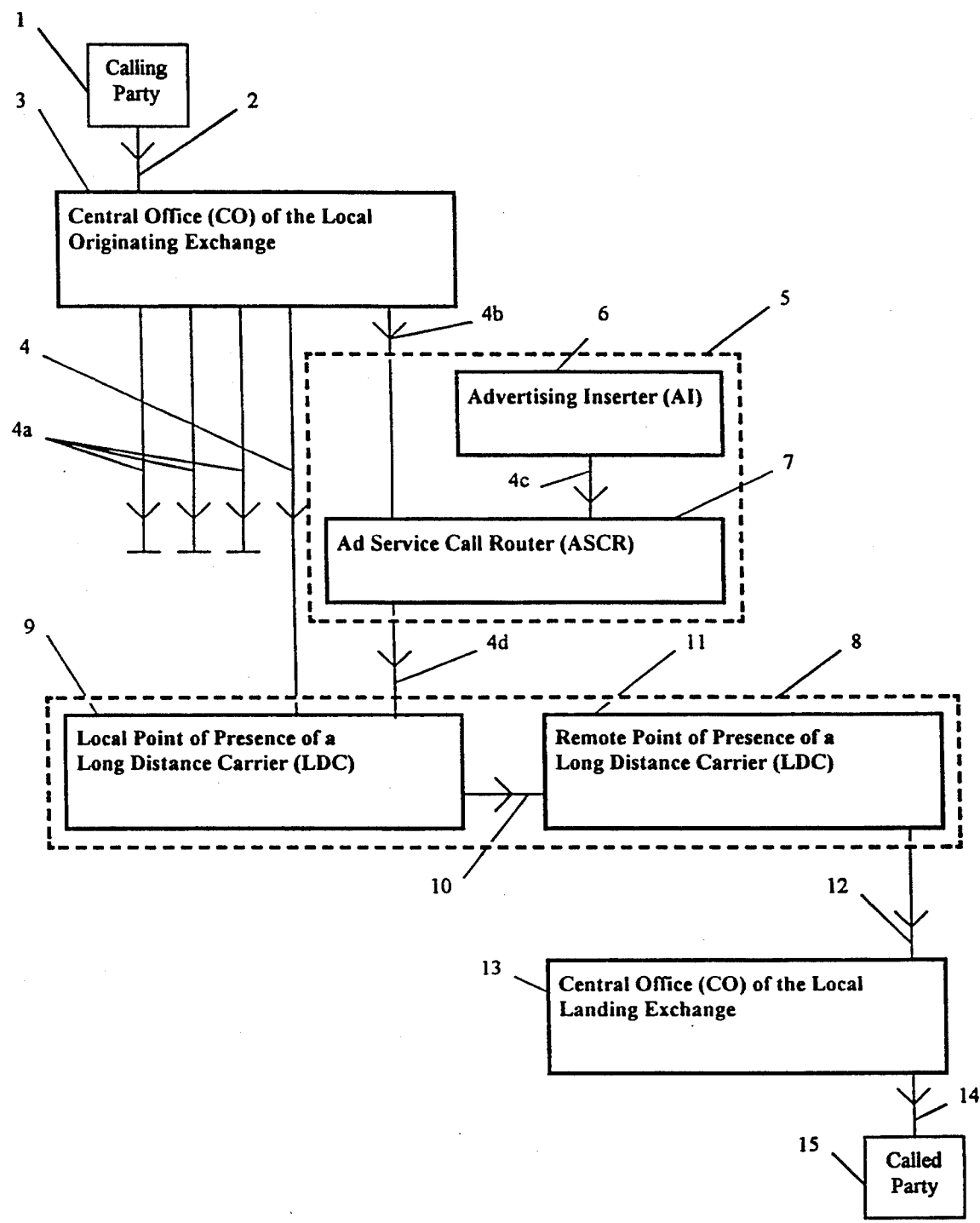
FIG. 1 is a block diagram of the invention as applied to a telephone system having limited capability.

FIG. 1 represents an elemental part of a typical long distance telephone system, adapted to serve many purposes of the present invention. In FIG. 1, the calling party's telephone equipment 1 (or "telephone," briefly) is connected by line 2 to the originating exchange 3 of the local telephone company. Correspondingly, the called party's telephone equipment or telephone 15 is connected via line 14 to the landing exchange 13 of the called party's local telephone company. The terms "originating" exchange and "landing" exchange are terms of reference when used with a caller and a called party at opposite ends of a communication system, considering a call initiated at one end of the system. For example, the originating exchange for a calling party in New York City would be one of the central offices owned by New York Telephone and the landing exchange for a called party in Los Angeles would be one of the central offices owned by Pacific Telephone and Telegraph. Each long distance carrier competing in an area must maintain a "point of presence" in the area with which to collect outgoing calls routed to it from the local exchange and to distribute incoming calls to the local exchange that have been routed to it from other regions. Each competing carrier's long distance network 8 has many points of presence, at least one in each area that is served. In FIG. 1, the local point of presence 9 of the long distance carrier is located geographically in the area of the originating exchange 3. The remote point of presence 11 of the long distance carrier is located geographically in the area of landing exchange 13. The originating as well as the landing exchange may assume various forms. At times each exchange is a single switching office and, in other circumstances, geographically distributed switching offices are integrated into one central exchange.

As illustrated in FIG. 1, the originating exchange 3 is connected to the local point of presence 9 of the long distance carrier by line 4 and by lines 4b and 4d. Line 4 is a direct connection between the local exchange and the local point of presence 9 of the long distance carrier operating the network 8. Lines 4a are direct connections to long distance networks (not shown) operated by competing carriers. These lines are provided to each of perhaps several long distance carrier by the local exchange company. Lines 4, 4a and 4b are made active selectively by the caller dialing the access code "10xxx" or "1" of a long distance carrier followed by the area code and telephone number of a called party. As an alternative, the caller dials a toll-free "800" number assigned to the advertising service; that "800" line is either served manually or it is specially equipped to acquire and respond to the area code and number of the called party.

Apparatus 5 of an "advertising service" is connected by lines 4b to the equipment of the originating exchange 3 and by lines 4d to the equipment of the long distance carrier's point of presence 9 in the area of the originating exchange. The advertising service apparatus consists of an "advertising inserter" or "ad inserter" 6 and an "ad service call router" 7. The connection from the advertising inserter to the ad service call router is diagrammatically represented by line 4c as will be apparent from the description (below) of FIG. 2. Elements 6 and 7 are either be separate apparatuses or they are combined in one piece of apparatus. They are shown separated here to call attention to their separate functions and to represent the feasibility of providing separated pieces of equipment for performing their separate functions.

Lines 10 of a long distance network interconnect points-of-presence 9 and 11; and lines 12 interconnect the remote point of presence of the long distance carrier and the landing exchange 13. Lines 14 (only one being shown) interconnect the landing exchange 13 and the called party 15. Lines 2, 4, 4a, 4b, 4c, 4d, 10, 12 and 14 each carry one call at a time or they each carry many calls simultaneously using multiplexing techniques.

In using the apparatus of FIG. 1, the calling party dials "1" or "10xxx" (as may be appropriate) and the area code and telephone number of the called party. The central office of the originating local exchange 3 recognizes the long distance carrier prefix and routes the call either directly to the local point of presence of the long distance carrier 9 via line 4 or to the ad service call router 7 of the advertising service apparatus 5 via line 4b, or to the point of presence of a competing long distance carrier via line 4a. (In the interest of brevity, the further discussion of FIG. 1 is devoted only to the advertising service apparatus 5.)

The advertising service apparatus 5 responds to an incoming or received call by taking the telephone number of the calling party and the area code and telephone number of the called party off the line and placing them in temporary computer storage. The telephone number of the calling party is provided by the local exchange in any of several different ways, as by transmitting tones on the line, by sending a stream of bits or by using a separate signaling circuit. The telephone number of the called party is also provided in any of several different ways. The area code and telephone number of the called party are then checked for validity by the ad service call router 7, and if not valid, the ad service plays a message such as "Your call cannot be completed as dialed . . ." for the caller and does not route the call any farther. An invalid number consists of, for example, a three digit area code that does not correspond to a number used in the area code numbering plan (that is, a nonexistent area code); an area code that is not served by the ad service for any number of reasons, such as unavailability of landing facilities or agreements; or an area code that has been blocked entirely, such as "900" pay-per-call codes; a local exchange that has been blocked entirely, such as "976" and "540" pay-per-call exchanges; or any other area code and number that are deliberately excluded from the calling capability of the advertising service apparatus. For example, those excluded area codes and telephone numbers are those of individuals or organizations who choose not to receive advertiser-supported calls.

If the area code and number are valid, the call is routed by the ad service call router 7 via line 4d (FIG. 1) to the point of presence 9 of the long distance carrier in the area in which the call originated, for example, New York City. The long distance carrier then routes the call via the long distance line or network of lines 10 to its point of presence 11 in the area corresponding to the area code and local exchange of the number of the called party, for example, Los Angeles. From there, the long distance carrier lands the call at the central office 13 of the local landing exchange in the called area. The central office routes the call on line 14 to the telephone number of the called party and rings telephone 15.

Figure 2:
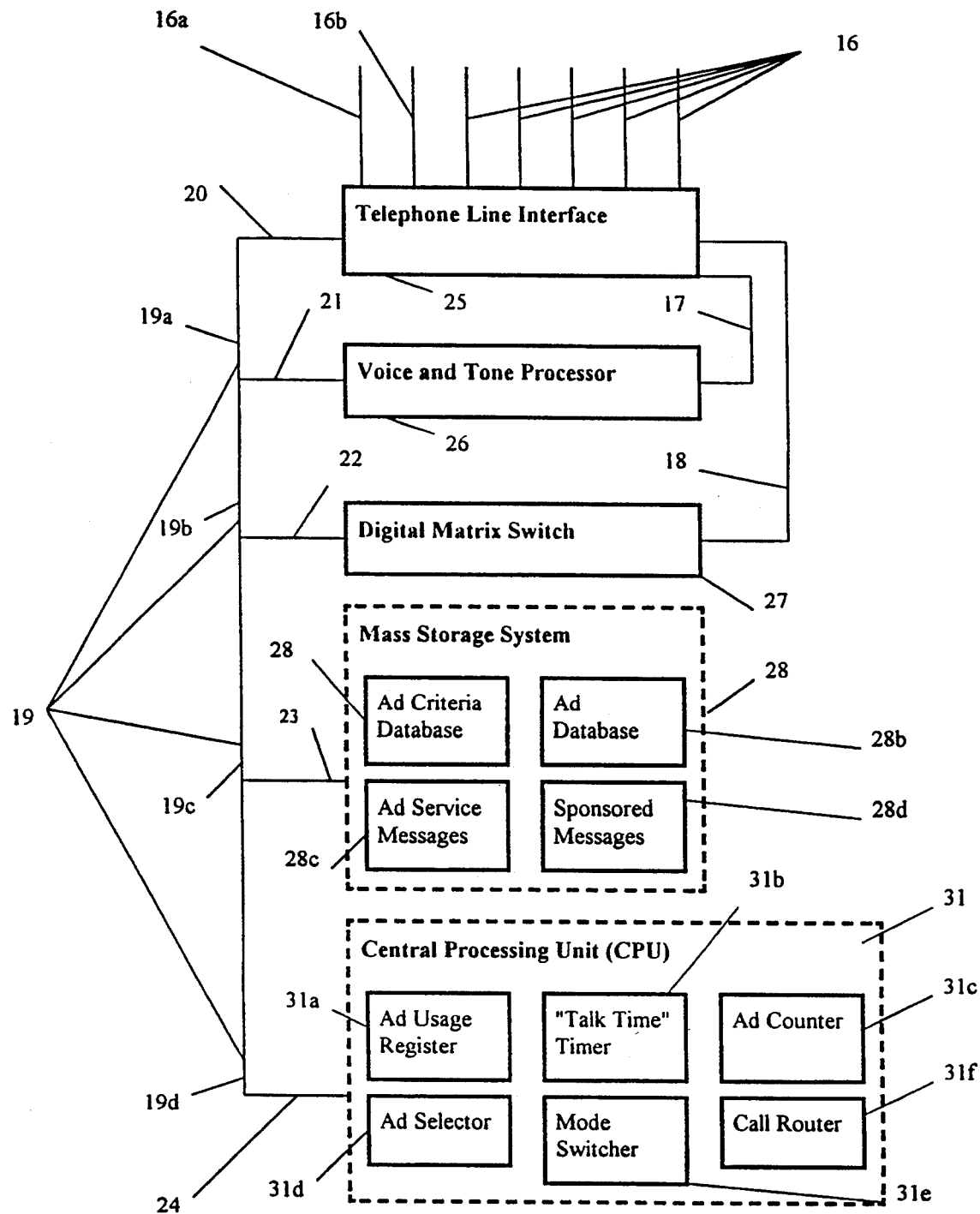
FIG. 2 is a block diagram of the advertising service apparatus.

FIG. 2 shows a functional block diagram of the advertising service apparatus 5 of FIG. 1, including the apparatus of both the advertising inserter 6 and the ad service call router 7. Both the advertising inserter and the ad service call router include the telephone line interface 25, the voice and tone processor 26, the digital matrix switch 27, the mass storage system 28 and the central processing unit 31 shown in FIG. 2, as well as software for performing various distinct functions. Although, the advertising inserter 6 and the ad service call router 7 are shown separate in FIG. 1 to emphasize their functional difference, they either exist separately or are integrated in one assembly as shown in FIG. 2.

In FIG. 2, lines 16, 16a and 16b are the various telephone lines that connect the telephone line interface 25 of the advertising service to the network. The roles of these lines are explained in the discussion that follows. The voice and tone processor 26 is used to convert messages stored in the apparatus into voice signals for delivery to the connected parties. The voice and tone processor 26 also captures received tones and pulses and generates tones for call routing. The voice and tone processor 26 also monitors the telephone lines to determine the status of the calls. The digital matrix switch 27 is used to connect the transmit and receive channels of the incoming and outgoing lines from and to the calling and called parties in order to effect the switching of calls. Many but not all of the functional components 25, 26 and 27 correspond to the ad service call router 7 of FIG. 1.

The mass storage system 28 is used to store the digitized ad message files including the storage for ad service messages 28c and the storage 28d for sponsored messages, the delivery criteria database or ad criteria database 28a for determining message selection and the accounting database or ad usage database 28b and the storages 28c and 28d for ad service messages and sponsored messages as well as the control software of the ad service apparatus. The central processing unit 31 uses the control software to direct and monitor the apparatus. The central processing unit 31 contains the ad usage register 31a used to keep track of messages delivered on each call, the talking time timer or talk time timer 31b used to control the length of time the parties are in communication with each other and the ad counter 31c used to keep track of how the ads needed to be loaded into storage or delivered in any particular message interval on a call. Lines 17 and 18 provide an internal "bus" of the ad service apparatus. The computer bus 19a, 19b, 19c and 19d enables the central processing unit 31 to communicate with the rest of the advertising service apparatus. Circuits 20, 21, 22, 23 and 24 connect the various elements of the ad service apparatus to the computer bus.

In FIG. 2, line 16a is the particular telephone line (of all the telephone lines 16) that carries the call initiated by the calling party in this discussion to the telephone line interface 25. (This line 16a corresponds to line 4b in FIG. 1.) The call is "answered" and then routed from the telephone line interface 25 on the telephone bus 17 to the voice and tone processor 26, which takes the tones representing the telephone number of the calling party and the tones representing the area code and telephone number of the called party off the line. The area code and number of the called party are routed via circuit 21, the computer bus 19b, 19c, and 19d and then circuit 24 to the central processing unit 31, where they are placed them in temporary computer storage. The central processing unit 31 then checks the area code and telephone number of the called party for validity using data accessed via circuits 23, 19d and 24 from the mass storage system 28, data that is also loaded into temporary storage in the central processing unit 31 via circuits 24, 19d and 23. If the area code and number or both are not valid, the central processing unit 31 directs the voice and tone processor 26 to play a message for the caller such as "Your call cannot be completed as dialed . . . Please check the number and try again . . . ," using a message stored in the mass storage system 28. If the area code and number are valid, the central processing unit 31 checks the telephone line interface 25 for an available line. Once available line 16b (of all the possible lines 16) has been located and selected, the central processing unit 31 directs the digital matrix switch 27 to connect line 16a to line 16b using the telephone bus 18. Lines 16a and 16b are channels to the caller's telephone and to the called party's telephone. The central processing unit 31 then directs the telephone line interface 25 to route the call out on line 16b. The ad inserter is then in one mode of operation, the mode in which there is communication between the parties.

Referring to FIG. 1, when the call is answered, a timer (not shown) in the advertising inserter 6 of the advertising service 5 apparatus is started in order to time the total length of the call. A second timer, which may be called the "talking time" timer or the "talk time" timer 31b (FIG. 2), is also started in the advertising inserter 6 when the call is answered, in this embodiment of the invention. An introductory ad service message, such as "Thank you for using . . . Advertising messages will occasionally interrupt your call . . . ," is now played, optionally, to one or both of the parties before connecting the call. Alternatively, this introductory message is omitted and the parties are connected immediately. When the timing interval of the second timer, the talking time interval timer, has elapsed, the ad service equipment is switched by mode switcher 31e to a different mode of operation. In this different mode of operation, the conversation between the parties is interrupted; instead the ad message provided by the advertising service 5 (FIG. 1) and obtained from sponsored message storage 28a (FIG. 2), is delivered to one or both of the parties at channels 16a and 16b (FIG. 2). As one alternative, the initial setting of the talking time interval timer and its subsequent settings allow fixed times for conversation. Alternatively, the settings are varied to allow periods of communication between the parties related to the length of the next-scheduled message or sequence of multiple messages or the just-delivered message or message sequence.

Figure 6:
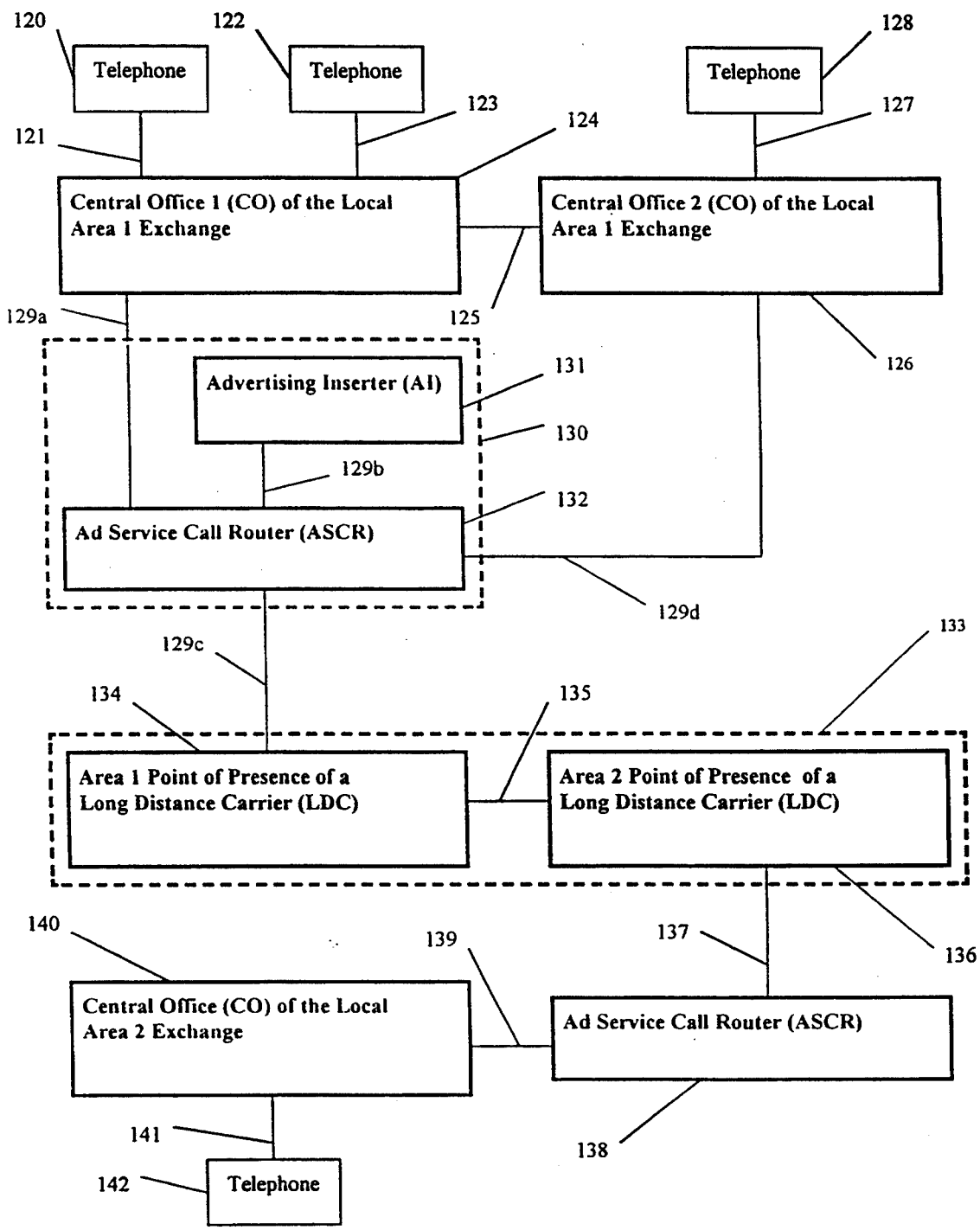
Figure 7A:
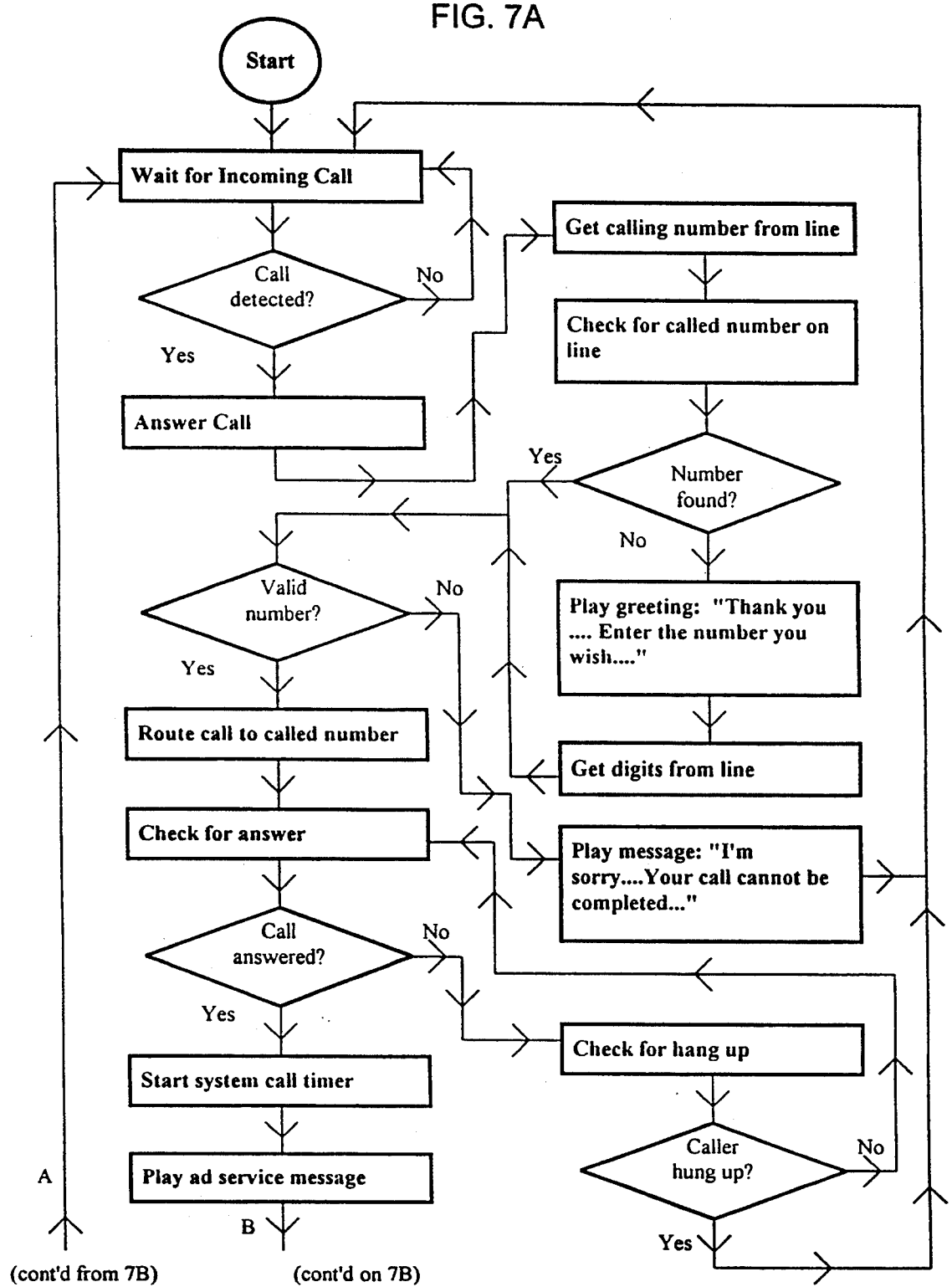
FIGS. 7A, 7B, 7C and 7D, together, are a flow chart representing the operation of the apparatus shown in part in FIG. 1.
Figure 7B:
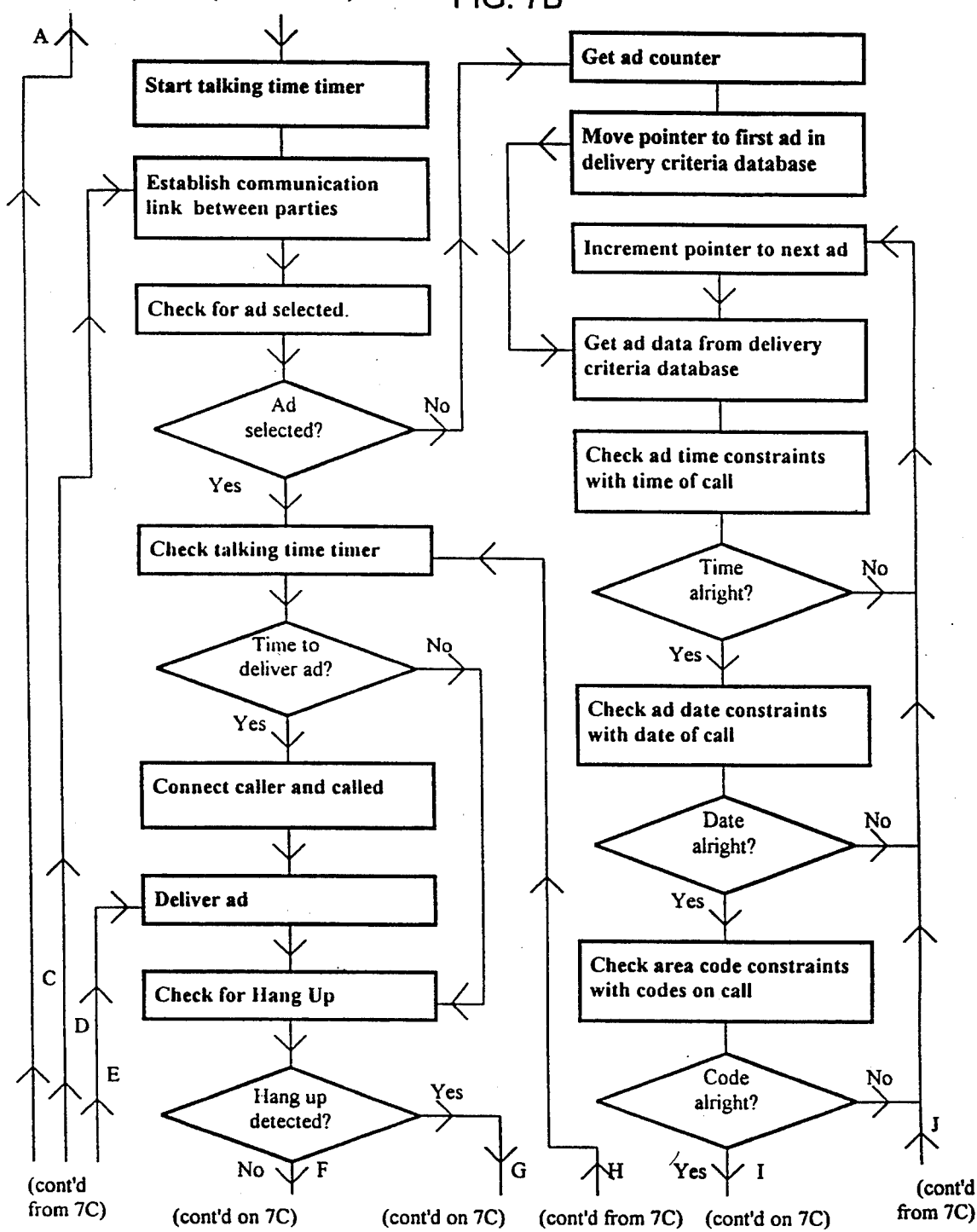
Figure 7C:
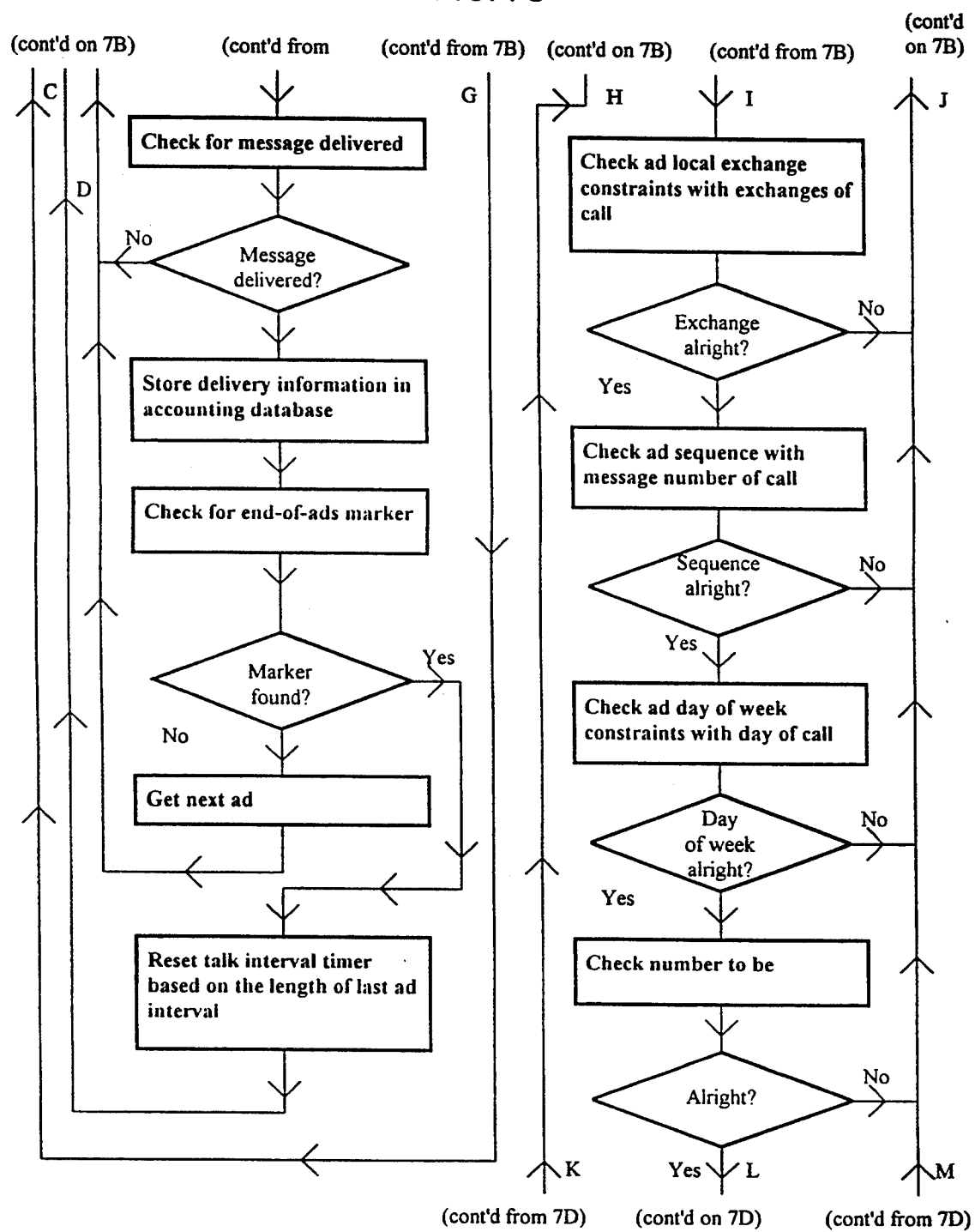
Figure 7D:
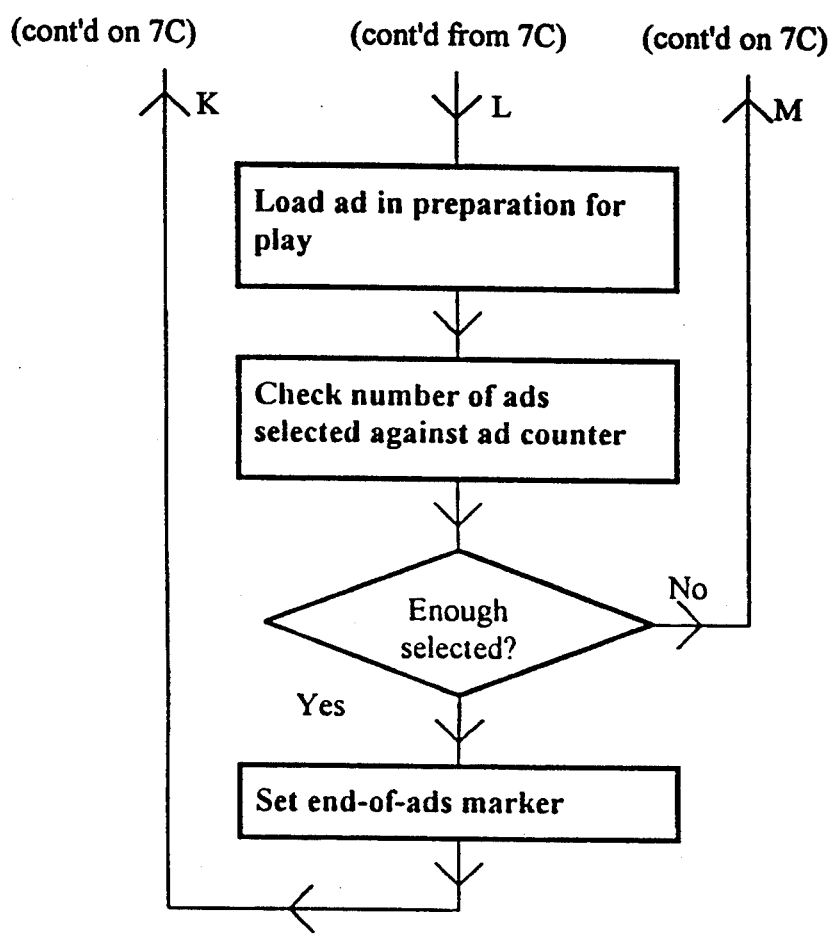

Referring again to FIG. 2, prior to or during the time that the parties are connected, one or more ad messages in sponsored message storage 28d are selected by ad selector means 31d ("Ad Selector") in FIG. 6 using information stored in a delivery criteria database 28a located in the mass storage system 28 and the selected message or messages is placed into temporary storage in the central processing unit 31 in preparation for delivery. As part of the ad selection criteria, the first message selected for delivery in each call is optionally an explanation of the advertisement dissemination system, similar to the introductory ad service message described above. The criteria for message selection also include a definite total number of times that an ad message should be delivered over a period of time during perhaps many telephone calls, the first and last dates on which an ad message is allowed to be delivered, the area codes and local exchanges that the delivery of the ad message should target or exclude, the day or days of the week on which the ad message is or is not to be delivered, the time of day at which any particular ad message must be or must not be delivered, whether a particular ad message should be the first, second or subsequent ad message during a call, whether the ad message must run exclusively or as part of a sequence of ad messages. In addition to the information stored in the delivery criteria database 28a, the ad service apparatus keeps information in the ad usage register 31a of the central processing unit 31 to further determine the suitability of a particular ad message on a particular call. This storage in the central processing unit is programmed to keep track of all previous ad messages delivered on a call; that storage becomes part of the message selection criteria that is used in the selection routine to prevent the delivery of the any particular ad message more than once either during a call or for a specified duration. The ad service apparatus is configured to prevent consecutive deliveries of the same ad message on the same call. Alternatively, the ad service apparatus is configured to prevent any repetition of any ad message on the same call. The central processing unit 31 is programmed to check the ad counter 31c to determine whether more than one ad messages need to be selected. The ad counter represents either the number of individual ad messages to be delivered during the next message interval when the party-to-party communication is interrupted or the total duration of the ad messages to be delivered during the next message interval. If, for example, the ad counter represents one unit, then one ad message will be delivered during the next message interval and if the ad counter represents two units, then two ad messages will be delivered. If the ad counter represents 30 seconds, then one or more ad messages totalling 30 seconds will be delivered during the next message interval. The ad counter is either fixed or variable. When variable, the ad counter is based on, for example, the length of a particular ad message or messages. If the ad counter indicates that more ad messages are needed, the program causes the search of the database to continue, one or more additional ad messages are selected. When the ad counter indicates that enough messages have been selected, the ad selector 31d stops searching the database.

The central processing unit 31 checks the talking time interval timer 31b until it is determined that sufficient time has elapsed for the ad message or messages to be delivered. When sufficient time has elapsed with the apparatus in the communication mode, the program of the central processing unit causes mode switches 31e to change the mode of operation of the ad service to switch to the mode in which the parties are disconnected from each other; each party is connected to an advertising delivery channel in the voice and tone processor 26 and the ad message is delivered.

When each ad message terminates, the central processing unit 31 is programmed to update the accounting information in the message usage database 28b in the mass storage system 28 relevant to the particular ad message by storing the ad message identifier, to increment and store in a counter the total number of times the selected message has been delivered, to store the telephone numbers of the calling and called parties, and to store the date and time the ad message was delivered. The central processing unit is also programmed to enter into storage delivery information for a selected message for avoiding repetition of any message during a call. The central processing unit is also programmed to check the ad counter 31c to determine whether more ad messages need to be delivered at this time and if so, the mode of operation is not reversed and the ad inserter continues to deliver the ad messages and store the accounting information until all the messages have been delivered. As an alternative to checking the ad counter to determine whether to terminate the message interval and change the mode of operation to that in which the parties are in communication with each other, the central processing unit is programmed to check for a marker or flag signifying the end of the message interval.

When the final ad message terminates during operation of the apparatus in the "different" mode of operation, the program of the ad inserter causes mode switcher 31e to reverse the mode of operation, whereupon each party is disconnected from the advertising delivery channel in the voice and tone processor 26 and the parties are again connected to each other so that the conversation may be resumed. A new talking time interval is determined, based either on a fixed interval or the length of the next-scheduled ad message or the length of the last delivered ad message. One or more ad messages is selected under program control, again based on the delivery criteria database 28a kept in the mass storage system 28 and the ad message information temporarily kept in the central processing unit 31. The reversals of the modes of operation are repeated until the call is terminated, either by the calling party or the called party hanging up or by action of a system timer.

As an alternative, the ad service apparatus in FIG. 1 is programmed to operate in the "different" mode initially, providing an initial ad message or messages to one or both of the parties on the call after the optional ad service introductory message and before switching the mode of operation to the communication mode. After completion of the initial ad message or messages, the program causes the mode of operation to change to the mode in which the calling and the called parties are in communication with each other. Referring to FIG. 2, in this configuration of the ad inserter, the ad message delivery database from the mass storage system 28 is searched prior to connecting the two parties and the talking time interval timer is set to limit the time during which the parties in communication with each other. Alternatively, the talking time interval timer 31b is set to a fixed party-to-party communication duration interval. The rest of the ad service apparatus is virtually unchanged.

Referring to FIG. 1, the advertising service apparatus 5 is equipped to supply any desired data for use as either as a basis for the long distance carrier and the local exchange to bill the advertising service or for use in advertising service accounting. The advertising service apparatus also has an ad usage database 28b (FIG. 2) for accruing the total usage of ad messages over a period of time, as a clear basis for billing the advertisers, on a per ad delivery basis or otherwise. The program uses the ad usage database, the delivery criteria database 28a (FIG. 2) and ad usage information stored temporarily in the ad usage register 31a (FIG. 2) to check the ad messages delivered during any call to avoid repetition of any ad message during any call.

In customary practice, dialing "1" or an alternative multi-digit access number automatically connects the caller to the telephone network, the caller routinely dials the number of the called party after dialing some prefix or access number. However, the ad service is also implemented without depending on dial "1" or alternative prefixes to establish equal access interconnection. The calling party reaches the advertising service apparatus using a toll-free "800" number or a local telephone number assigned to the advertising service. Because the number that the calling party wishes to be connected to is not routed to the advertising service by an equal access prefix in this implementation, the ad service must prompt the caller by a recorded oral request or a tone to enter digits using the telephone keypad or dial. This involves a separate step, after the advertising service has been reached. Once the area code and telephone number of the called party has been received, the ad service functions similarly to the equal access implementation.

Figure 3:
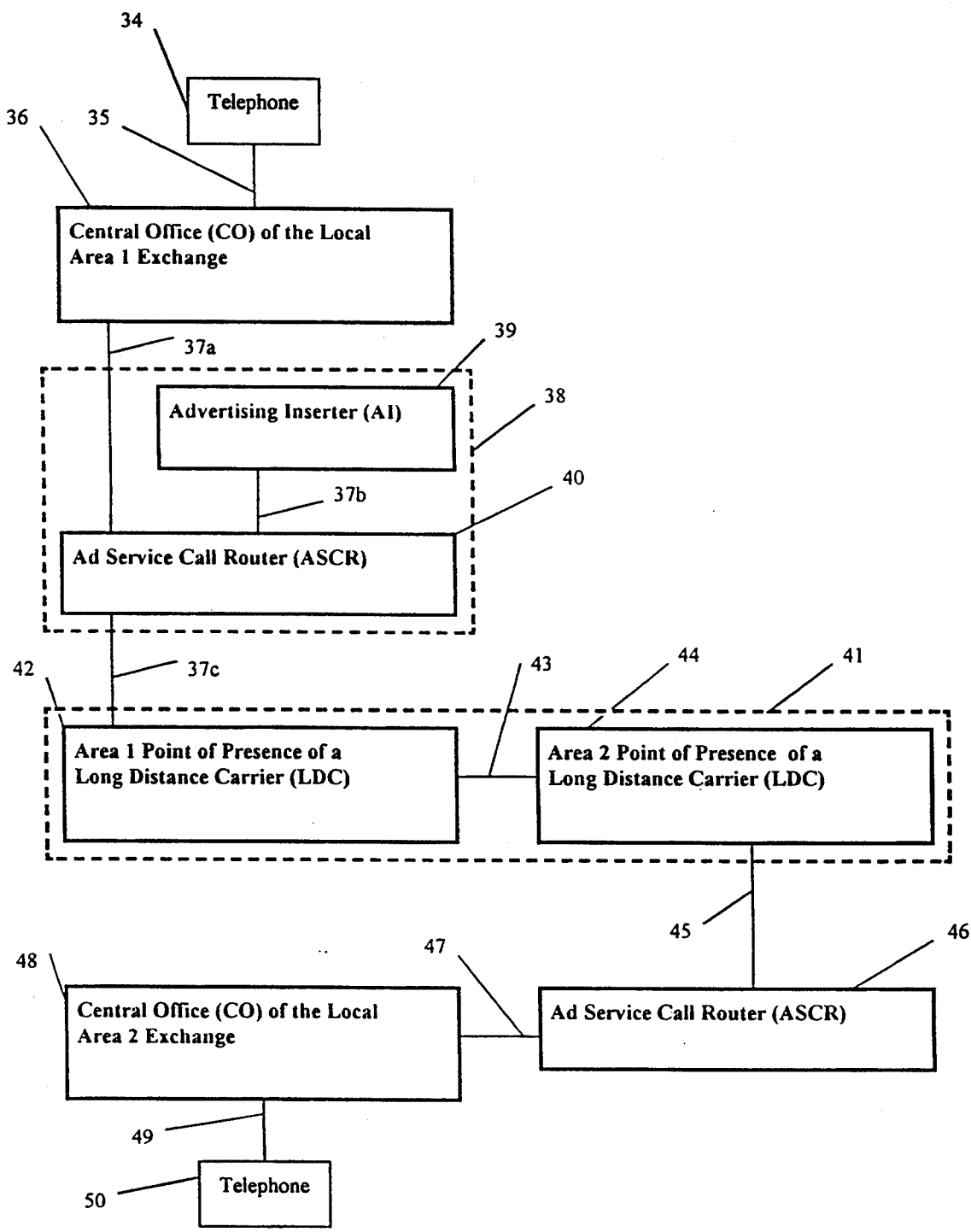
FIGS. 3, 3A, 3B, 4, 5 and 6 are block diagrams of modifications of the embodiment in FIG. 1, as applied to telephone systems having varied capabilities.

The diagram of FIG. 1 illustrates the telephone system including the advertising service as it applies to a call initiated from the originating exchange and reaching a called party through the landing exchange. A more comprehensive representation of a telephone system that includes the advertising service apparatus is shown in FIG. 3. This figure shows the whole system as it applies to a calling party at either end of the system of FIG. 1. The calling/called party becomes "telephone" at each end of the system. Lines 4 and 4a of FIG. 1 are omitted to simplify the diagram (FIG. 3).

The block diagram in FIG. 3 shows the embodiment of the invention in FIG. 1 with the additional capability of handling a call originating in an area remote to the advertising service, for example, a call originating from telephone 50. This capability is implemented by adding an ad service call router 46 connected between the central office 48 of the local exchange and the point of presence 44 of the long distance carrier in area 2. This call router differs only from the advertising service apparatus 5 in FIG. 1 in that it is not equipped with ad insertion equipment.

The ad service call router has all the call routing capabilities of the advertising service, apparatus 5 of FIG. 1, but it cannot insert ad messages into calls. Referring to FIG. 2, the functional block diagram of the advertising service contains all the elements of the ad service call router. Again, lines 16, 16a and 16b are telephone lines that connect the telephone line interface 25 of the ad service call router to the network. Lines 17 and 18 are the internal telephone lines of the ad service or telephone "bus" on which calls are connected and switched. The computer bus 19a, 19b, 19c and 19d enables circuit routes 31f in the central processing unit 31 to control call switching and routing using the various elements of the ad service call router.

Referring to FIG. 3, when a call originates from an area containing only an ad service call router, all call timing and ad message insertion are done by an advertising inserter 39 in an advertising service 38 in an area remote from the area of the originating ad service call router 46. The ad messages are selected using information stored in a delivery criteria database located in the remote advertising service 38 and delivered on the call at the location of the remote advertising service 38. The message usage database is also stored at the remote advertising service 38. In FIG. 3, a call originates from telephone 50 by dialing "1" or "10xxx" (as may be appropriate) and the area code and telephone number of the called party. The call is routed via line 49 to the local exchange 48 in area 2, which recognizes the long distance carrier prefix and routes the call via line 47 to the ad service call router 46 which serves as the local point of presence for the advertising service 38 in area 2. The call is then routed via line 45 to the area 2 point of presence 44 of the long distance carrier network 41 and then via line 43 to the area 1 point of presence 42 of the long distance carrier. The call is routed to the advertising service 38 via line 37c. There, the ad service call router 40 routes the call via line 37a to the local exchange 36 and from there via line 35 to telephone 34. From this point, the call is handled similarly to the call in FIG. 1, with ad messages for both parties inserted by the advertising inserter 39 via line 37b.

In FIG. 3, a call originating at telephone 34 is handled similarly to a call in FIG. 1, except that it is routed in area 2 by the ad service call router 46, acting as the point of presence of the remote advertising service, to the central office 48 in the remote area 2 exchange and then to telephone 50. Again, ad messages for both parties are inserted by the advertising inserter 39 in area 1.

Figure 3A:
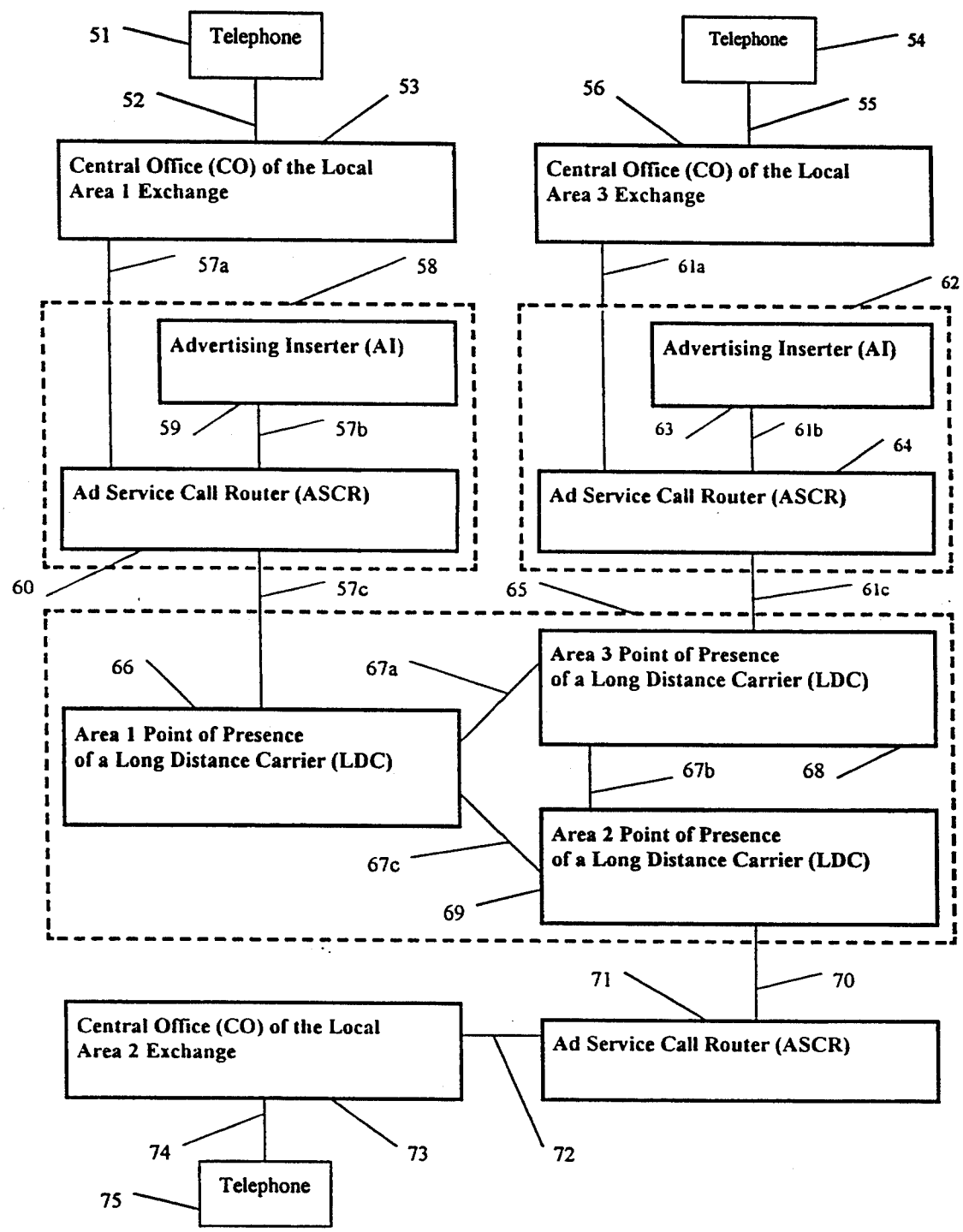

The block diagram in FIG. 3A shows the embodiment of the invention in FIG. 3 with an additional node on the network in area 3, which contains an additional advertising service 62 containing an advertising inserter 63 and ad service call router 64. In this configuration, any call from any local exchange is able to be processed as long as one of the parties served is in an area containing an advertising service (area 1 or area 3).

In FIG. 3A, a call originating at telephone 51 is routed to telephone 75 similarly to FIG. 1. The call is routed from telephone 51 via line 52 to the local exchange 53 in area 1. The call is then routed via line 57a to the ad service call router 60 of the advertising service 58 in area 1. The ad service call router routes the call via line 57c to the area 1 point of presence 66 of the long distance transmission network 65. The call is then routed to the area 2 point of presence 69, either directly via line 67c or indirectly through the area 3 point of presence 68 via lines 67a and 67b. The call is then routed via line 70 to the ad service call router 71 in area 2. The ad service call router routes the call via line 72 to the local exchange 73 in area 2, which routes the call via line 74 to telephone 75. Once the call is connected, all ad message insertion is performed by the advertising inserter 59 via line 57b in advertising service 58.

A call originating at telephone 54 is routed to telephone 75 in a similar fashion. The call is routed from telephone 54 via line 55 to the local exchange 56. The call is then routed via line 61a to the point of presence 68 in area 3 of the long distance network 65. The call is then routed to the point of presence 69 in area 2, either directly via line 67b or indirectly via line 67a, the point of presence in area 1 and line 67. The call is then routed via line 70 to the ad service call router 71 in area 2 and then via line 72 to the local exchange 73 to line 74 and telephone 75. In this case all ad messages are added via line 61b to the call at advertising inserter 63 in area 3.

Further, a call originating at telephone 75 is routed to telephone 51 similarly to FIG. 3. The call is routed via line 74 to the local exchange 73 in area 2, which recognizes the long distance carrier prefix and routes the call via line 72 to the ad service call router 71 which serves as the local point of presence for the advertising service 58 in area 2. The call is then routed via line 70 to the area 2 point of presence 69 of the long distance carrier network 65 and then via line 67c to the area 1 point of presence 66 of the long distance carrier. The call is routed to the advertising service 58 via line 57c. There, the ad service call router 60 routes the call via line 57a to the local exchange 53 and from there via line 52 to telephone 51. Ad messages for both parties are inserted by the advertising inserter 59 via line 57b. A call originating at telephone 75 is routed to telephone 54 similarly.

The embodiment of the invention shown in FIG. 3A enables a call to be routed from an area containing a complete advertising service (for example, area 1) to an area containing another complete advertising service (area 3). A call originating at telephone 51 is routed via line 52 to the local exchange 53 in area 1. The call is then routed via line 57a to the ad service call router 60 of the advertising service 58. The call is routed to the point of presence 66 in area 1 of the long distance network 65. The call is then routed to the point of presence 68 in area 3 of the long distance carrier. The call is routed via line 61c to the ad service call router 64 of the advertising service 62 in area 3. The call is then routed via line 61a to the local exchange 56 and via line 55 to telephone 54. In this case, the insertion of advertising takes place either at advertising inserter 59 or advertising inserter 63 in area 1 or area 2, respectively, or both. A call originating at telephone 54 is routed to telephone 51 similarly.

Figure 3B:
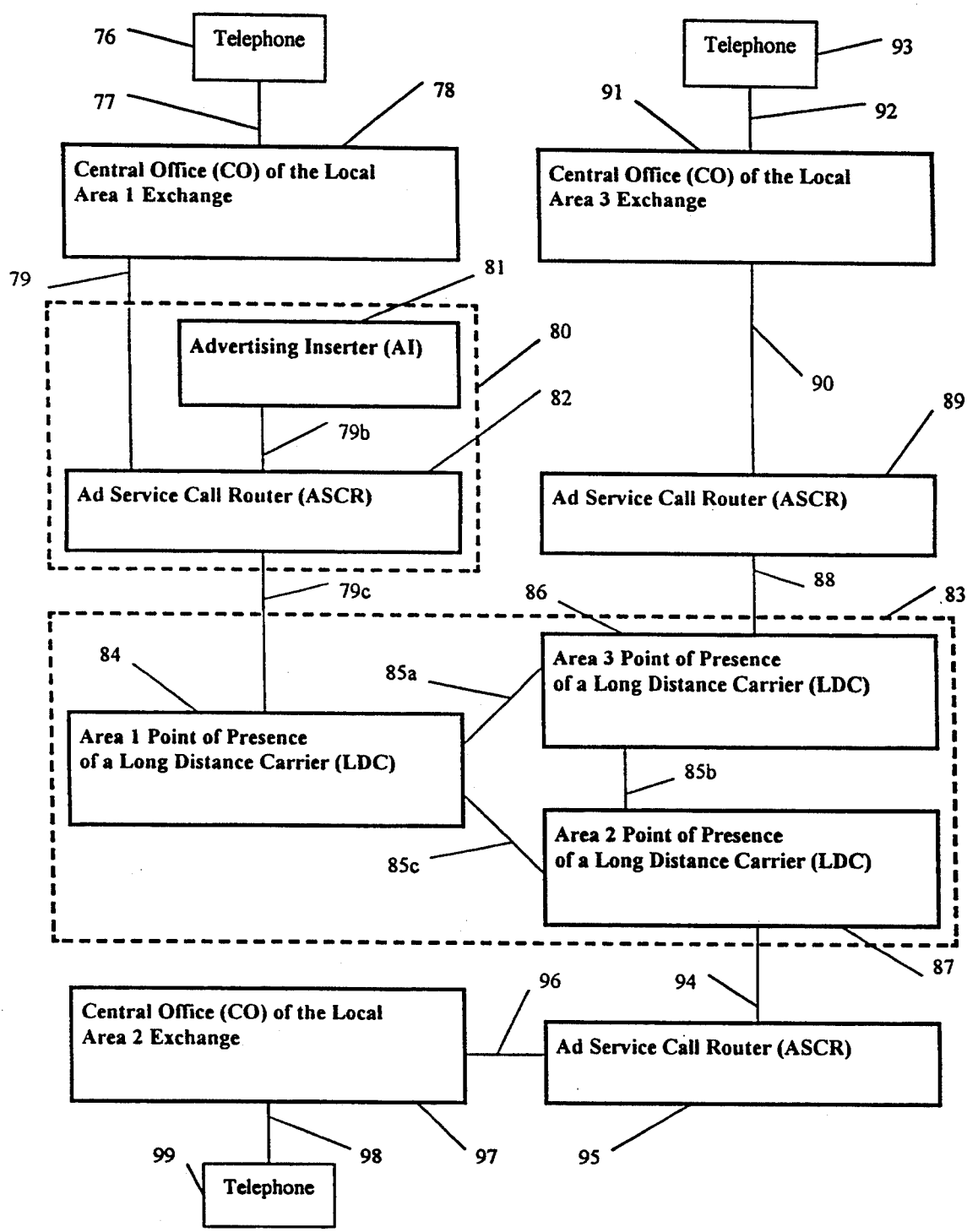

The block diagram in FIG. 3B shows the embodiment of the invention in FIG. 3 with the addition of a network on the node containing an ad service call router 89 without an advertising inserter. This configuration allows any call from any local exchange to be processed as long as one of the parties served is in an area containing an advertising service (area 1) or as long as the call is routed through a remote advertising service 80 (area 1).

In FIG. 3B, a call originating at telephone 76 is routed to telephone 93 similarly to FIG. 3. The call is routed from telephone 76 via line 77 to the local exchange 78 in area 1. The local exchange 78 routes the call via line 79a to the ad service call router 82 of advertising service 80. The ad service call router routes the call via line 79c to the point of presence 84 in area 1 of the long distance transmission network 83. The call is then routed to the area 2 point of presence 87, either directly via line 84c, or indirectly. The call is routed on line 94 to the ad service call router 95 in area 2. The ad service call router routes the call via line 96 to the local exchange 97 in area 2. The local exchange routes the call via line 98 to telephone 99. Once the call is connected, ad messages are inserted by advertising inserter 81 via line 79b. A call originating from telephone 76 is routed to telephone 93 similarly.

A call originating at telephone 93 is routed to telephone 76 similarly to FIG. 3. A call is routed from telephone 93 via line 92 to the local exchange 91 in area 3, which routes the call via line 90 to the ad service call router 89 which serves as the local point of presence in area 2 for the advertising service 80 in area 1. The call is then routed via line 88 to the area 3 point of presence 86 of the long distance carrier network 83 and then via line 85a to the area 1 point of presence 84 of the long distance carrier. The call is routed to the advertising service 80 via line 79c. There, the ad service call router 82 routes the call via line 79a to the local exchange 78 and from there via line 77 to telephone 76. When the called party answers, all ad messages for both parties are inserted by the advertising inserter 81 via line 79b. A call from telephone 99 to telephone 76 is handled similarly.

A call originating at telephone 93 is routed to telephone 99 by first routing the call through the advertising service 80 in area 1. The call is routed via line 92 to local exchange 91 in area 3. The call is then routed via line 90 to ad service call router 89 and then via line 88 to the point of presence 86 in area 3 of the long distance network 83. The call must then be routed to the point of presence 84 of the long distance carrier in area 1, either directly via line 85a or indirectly via line 85b through point of presence 87 to line 87c. The call is then routed via line 79c to the ad service call router 82 in advertising service 80 in area 1. The call is then routed back out into the long distance transmission network 83 to point of presence 84 and then either directly or indirectly to point of presence 87. Here, the call is routed via line 94 to the ad service call router 95, then via line 96 to local exchange 97 in area 2. Finally, the call is routed via line 98 to telephone 99. After the call is connected, all insertion of ad messages must take place at advertising inserter 81 in area 1. Similarly, a call originating at telephone 99 is routed to telephone 91 by first routing the call through the long distance transmission network 83 to the advertising service 80 in area 1, so that the insertion of advertising takes place. The call is then routed back into the long distance transmission network 83 to continue routing to the area code and number of the called party.

Using the implementation shown in FIG. 3B allows an entire network to be constructed using only one advertising service as long as every node on the network contains an ad service call router to route calls through the ad service.

Figure 4:
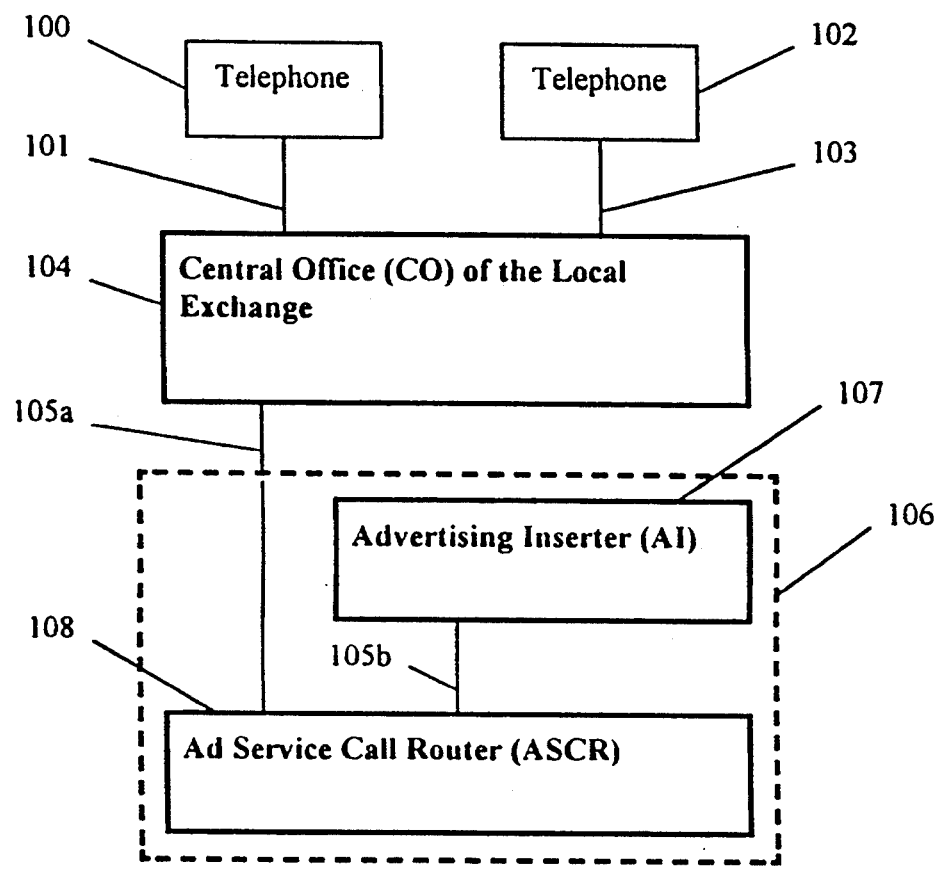

The block diagram in FIG. 4 shows the embodiment of the invention in FIG. 1 with the additional capability of handling a call originating at and landing at telephones served by the same central office of a local exchange. In FIG. 4, the calling party originates a call from telephone 100 by dialing a local telephone number or a toll-free "800" assigned to the advertising service (as may be appropriate). In this embodiment the telephone number of the called party is not available to the ad service on the line from the local exchange and will be prompted for with a recorded voice or tone. A call originating at telephone 100 is routed via line 101 to the central office 104 of the local exchange. The central office either routes the call directly to telephone 102 via line 103, without the use of the advertising service, or routes the call via line 105a to the ad service call router. The ad service call router 108 routes the call back to the central office 104 via line 105a and the central office routes the call via line 103 to telephone 102. Advertising messages are now inserted on the calls routed through the advertising service by advertising inserter 107 via line 105b. A call originating at telephone 102 is routed to telephone 100 similarly. Again, advertising messages are now inserted on the calls routed through the advertising service by advertising inserter 107 via line 105b. Ad messages are not inserted into calls that are routed directly from one telephone through the local exchange to another telephone.

Figure 5:
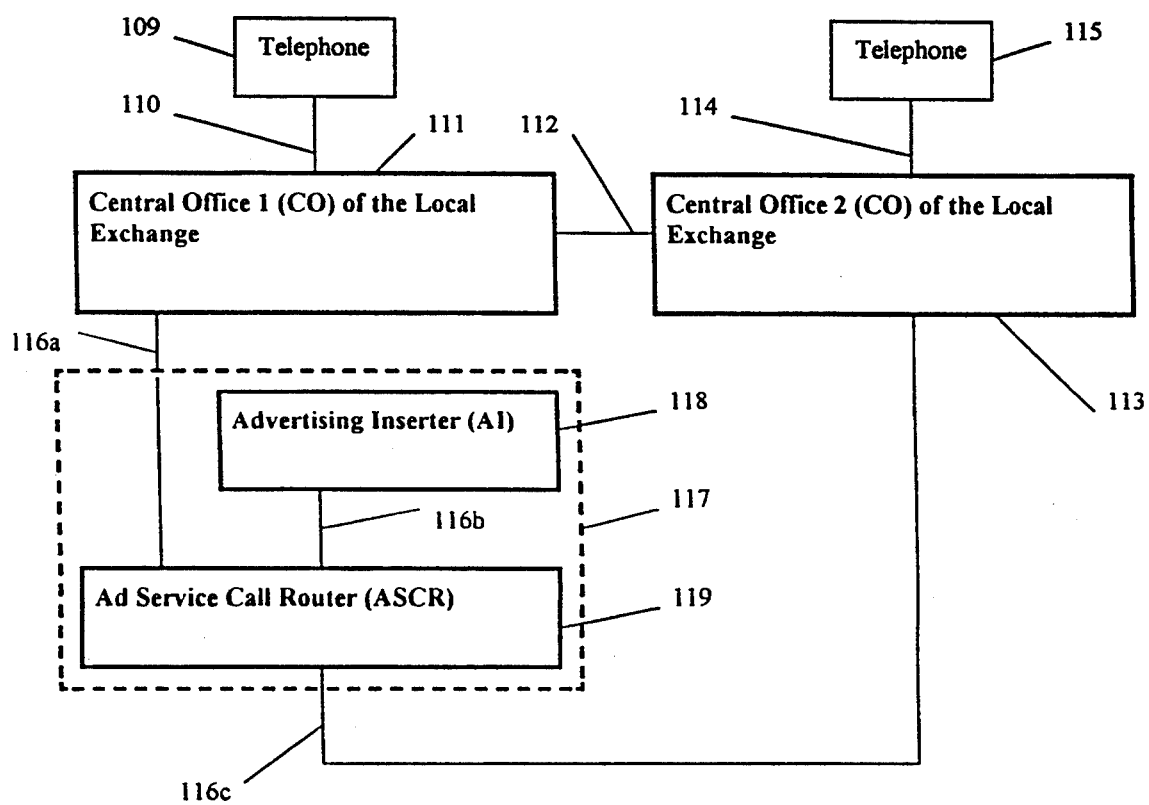

The block diagram in FIG. 5 shows the embodiment of the invention in FIG. 1 with the additional capability of handling a call originating at and landing at telephones served by different central offices of the same local exchange. A call originating (as in FIG. 4) at telephone 109 is routed via line 109 to the central office 111 of the local exchange. The central office either routes the call directly to another office 113 via line 112, without the use of the advertising service, or routes the call via line 116a to the ad service call router 119 in advertising service 117. Calls routed via line 112 to central office 113 are now routed via line 114 to telephone 115. Calls routed to the ad service call router 119 are now routed via line 116c the call to central office 113 of the local exchange. The central office 113 routes the call via line 114 to telephone 115. Calls routed though the advertising service 117 have ad messages inserted by advertising inserter 118 via line 116b. Calls routed directly do not have ad messages inserted by advertising inserter 118 via line 116b. A call originating at telephone 115 is routed to telephone 109 similarly. Again, only those calls routed through the advertising service 117 will have ad messages inserted.

The block diagram in FIG. 6 shows the embodiment of the invention in FIG. 1 with the many of the additional capabilities shown in FIGS. 3, 4 and 5 integrated into one system that combines the insertion of advertising messages with both local exchange routing and long distance transmission. Any or all of the embodiments of the system shown in FIGS. 1, 3, 3A, 3b, 4 and 5 are able to operate simultaneously in a system like that shown in FIG. 6.

The block diagram in FIG. 6 contains one advertising service 130 including an advertising inserter 131 and ad service call router 132 in area 1 and an ad service call router 138 in area 2. All ad messages on all calls in the system shown in FIG. 6 are inserted by advertising inserter 131 via line 129b. The advertising service 130 is connected to central office 124 of the local exchange in area 1 by line 129a, to the central office 126 of the local exchange in area 1 by line 129d and to long distance transmission network 133 by line 129c.

A call originating at telephone 120 is routed on line 121 to central office 124. Central office 124 routes the call either via line 123 to telephone 122, via line 125 to central office 126 or via line 129a to ad service call router 132 of advertising service 130. The ad service call router routes the call either to central office 126 via line 129d or to point of presence 134 in area 1 of long distance transmission network 133. Calls routed to central office 126 either directly or through the advertising service are routed via line 127 to telephone 128. Calls routed to point of presence 134 in area 1 are routed via line 135 to point of presence 136 in area 2. These calls are now routed via line 137 to ad service call router 138 in area 2. The ad service call router routes the calls via line 139 to local exchange 140 in area 2. Local exchange 140 now routes the calls via line 141 to telephone 142.

The block diagram consisting of FIGS. 7A, 7B, 7C and 7D illustrates the flow of the ad service software. In this description, whenever reference is made to data, the data are contained in the appropriate storage of the apparatus and the software of the computer provides access to these data and use of the data as described below. Moreover, the computer has the capability to process multiple calls concurrently in the manner described. In the initial state, the ad service waits for incoming calls. When a call is detected, the ad service "answers" the call and gets the telephone number of the calling party from the line. As described earlier, the telephone number of the calling party and the telephone number of the called party are obtained, alternatively, in other ways, for example, a separate signaling circuit, but these other methods are omitted in this description for simplicity. The ad service checks to see if the telephone number of the called party is on the line in order to route the call. If there is no telephone number on the line, the ad service prompts the caller, "Please enter the number you want . . . ," and captures the digits that the caller enters using the telephone keypad or dial.

The ad service then checks to see if the number is a valid area code and telephone number, able to be connected by the ad service. If it is not, a message is played, "I'm sorry . . . Your call cannot be completed . . . ," and the calling party is disconnected, and the ad service awaits a new call. If the telephone number is valid, the ad service selects an outgoing line and routes the call via this line to the area code and telephone number of the called party. If the called party does not answer, the ad service checks if the calling party has hung up. If the calling party has hung up, the ad service waits for a new call.

When the called party answers, the call timer is started, an introductory ad service message, such as "Thank you for using . . . Advertising messages will occasionally interrupt your call . . . ," is optionally played to one or both of the parties, the talking time interval timer is started, and the parties are placed in communication with each other. Alternatively, the ad service introductory message is omitted.

The ad service then checks to see if an ad message has already been selected. (This occurs during the talking time interval of operation.) Generally, but not necessarily, the first time the ad service checks, there will not be a selected ad message. If an ad message has not been selected, the ad service checks the ad counter, which is either the number of individual ad messages to be delivered during the next message interval or approximately the total duration of the ad messages to be delivered during the next message interval. Then, the ad service accesses the ad message delivery criteria database and gets the data for the first available ad message from the database. First, the current time is checked against the times when the ad message is allowed to be delivered. If the ad message is not allowed to be delivered at the current time, the ad service gets the data for the next ad message from the database and starts checking again. The current date is checked against the dates when the ad message is allowed to be delivered. If the ad message is not allowed to be delivered on the current date, the ad service gets the data for the next ad message from the database and starts checking again. The area codes of the calling or the called party or both are checked against the area codes where the ad message is allowed to be delivered. If the ad message is not allowed to be delivered in these area codes, the ad service gets the data for the next ad message from the database and starts checking again. The local exchanges of the calling or the called party or both are checked against the local exchanges where the ad message is allowed to be delivered. If the ad message is not allowed to be delivered in these exchanges, the ad service gets the data for the next ad message from the database and starts checking again. The present ad message position (that is first, second, or so on) number is checked against the ad message position numbers in which the ad message is allowed to be delivered. If the ad message is not allowed to be delivered at the current ad message position, the ad service gets the data for the next ad message from the database and starts checking again. The current day of the week is checked against the days when the ad message is allowed to be delivered. If the ad message is not allowed to be delivered on the current day of the week, the ad service gets the data for the next ad message from the database and starts checking again. The number of times the ad message must be delivered is checked against the total number of times the ad message has already been delivered during the accounting period. If the ad message has already been delivered a sufficient number of times during that period, the ad service gets the data for the next ad message from the database and starts checking again. When an ad message is selected, it is loaded into active memory in preparation for delivery on the call. The ad service then checks the ad counter to determine if enough ad messages have been selected for the ensuing message interval. If more ad messages are needed, the ad service continues to search through the database, selects ad messages and loads the selected ad messages in preparation for delivery during the ensuing message interval on the call. When enough ad messages have been selected, the ad service stops searching the database and sets the end-of-ads marker. The end-of-ads marker is used by the ad service apparatus to determine when the last ad message has been delivered in a message interval. The end-of-ads marker is alternatively implemented as a counter.

The talking time timer is made variable in dependence on the time required for the delivery of the selected ad message or messages. The control software uses data stored in the criteria database or the usage database or both to adjust the time interval setting of the talking time timer.

The ad service checks the talking time interval timer. If it is not yet time to deliver an ad message, the ad service continues to check whether the calling party or the called party have hung up. If one or both parties have hung up, the ad service awaits a new call. If the parties have not hung up, the ad service repeats this sequence by checking the talking time interval timer again.

If the talking time interval timer indicates that it is time to deliver an ad message, the communication link between parties is interrupted and one or both of the parties is connected to an advertising delivery channel and the ad message is delivered to the calling line, the called line or both. After each ad message is delivered, the ad service checks whether either party has hung up. If neither party has hung up, the ad message delivery data are stored in the delivery accounting database. The ad message delivery data include the message number of the ad message, the number of times or the total time duration that the particular ad message has been delivered, the time and date of the delivery, the area codes and telephone numbers of the parties to which it was delivered. The ad service then checks for the presence of the end-of-ads marker to determine if more selected ad messages should be delivered, and if so, delivers the selected ad messages. As an alternative to checking for the presence of the end-of-ads ad counter to determine whether to terminate the message interval, the ad service could store the number of ads selected in a counter (not shown) and decrement this counter each time an ad is delivered until the end of the message interval is indicated by the counter.

After the end-of-ads marker signifies that the final ad message has been delivered, each party is disconnected from the advertising delivery channel and the communication link between the parties is reestablished. The ad service restarts the talking time interval timer. The ad service then repeats the described process of selecting a new ad message or messages.

The block diagram consisting of FIGS. 8A, 8B, 8C and 8D illustrates the flow of the ad service software of an alternative operation of the ad service apparatus in which one or more ad messages is delivered at the beginning of a call and then the parties are in communication with each other during a preset talking time interval after which the parties on the call are disconnected.

Figure 8A:
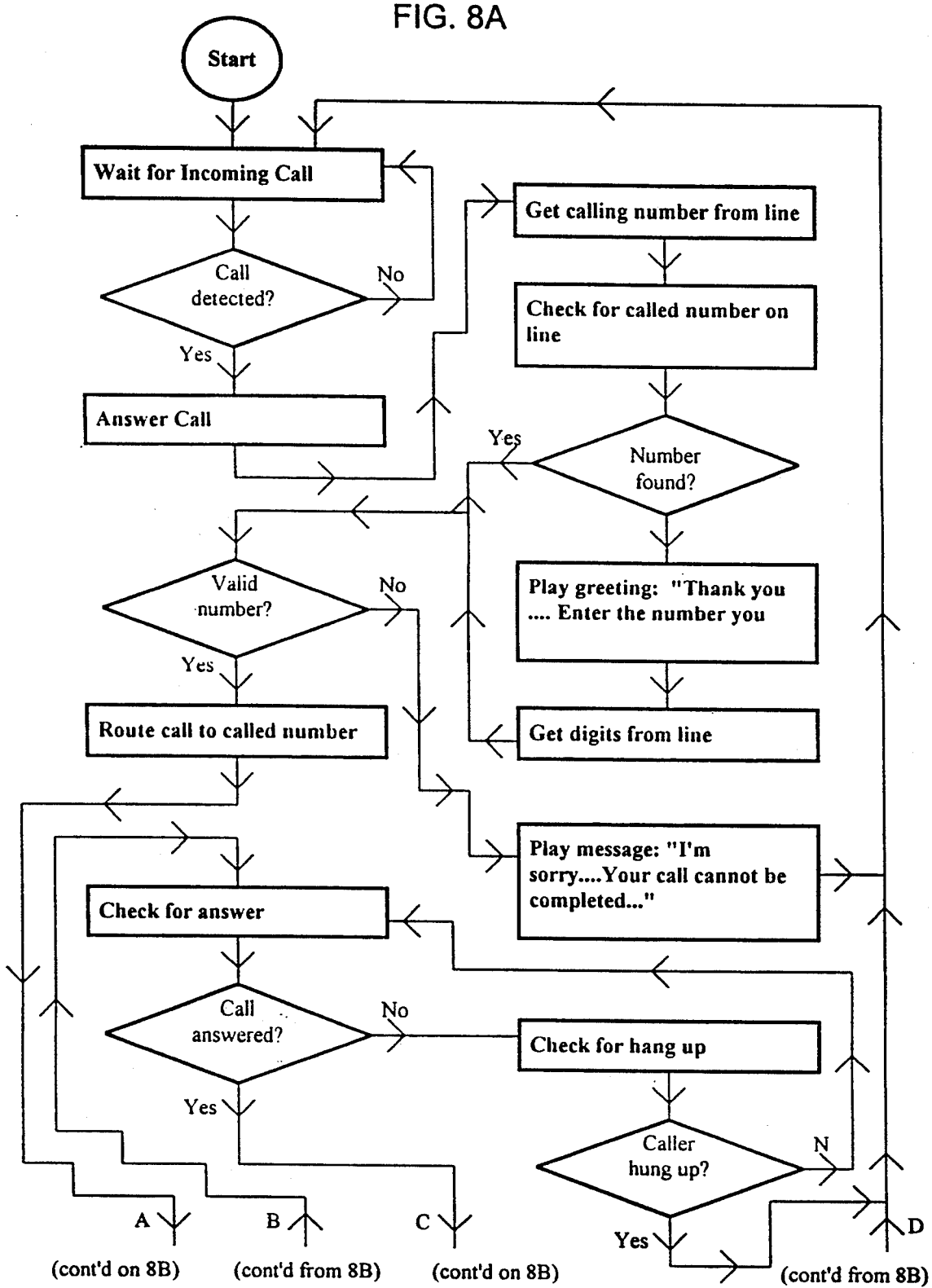
FIGS. 8A, 8B, 8C and 8D, together, are a flow chart representing an alternative to the operation of the apparatus of FIG. 1 including apparatus not shown in FIG. 1.
Figure 8B:
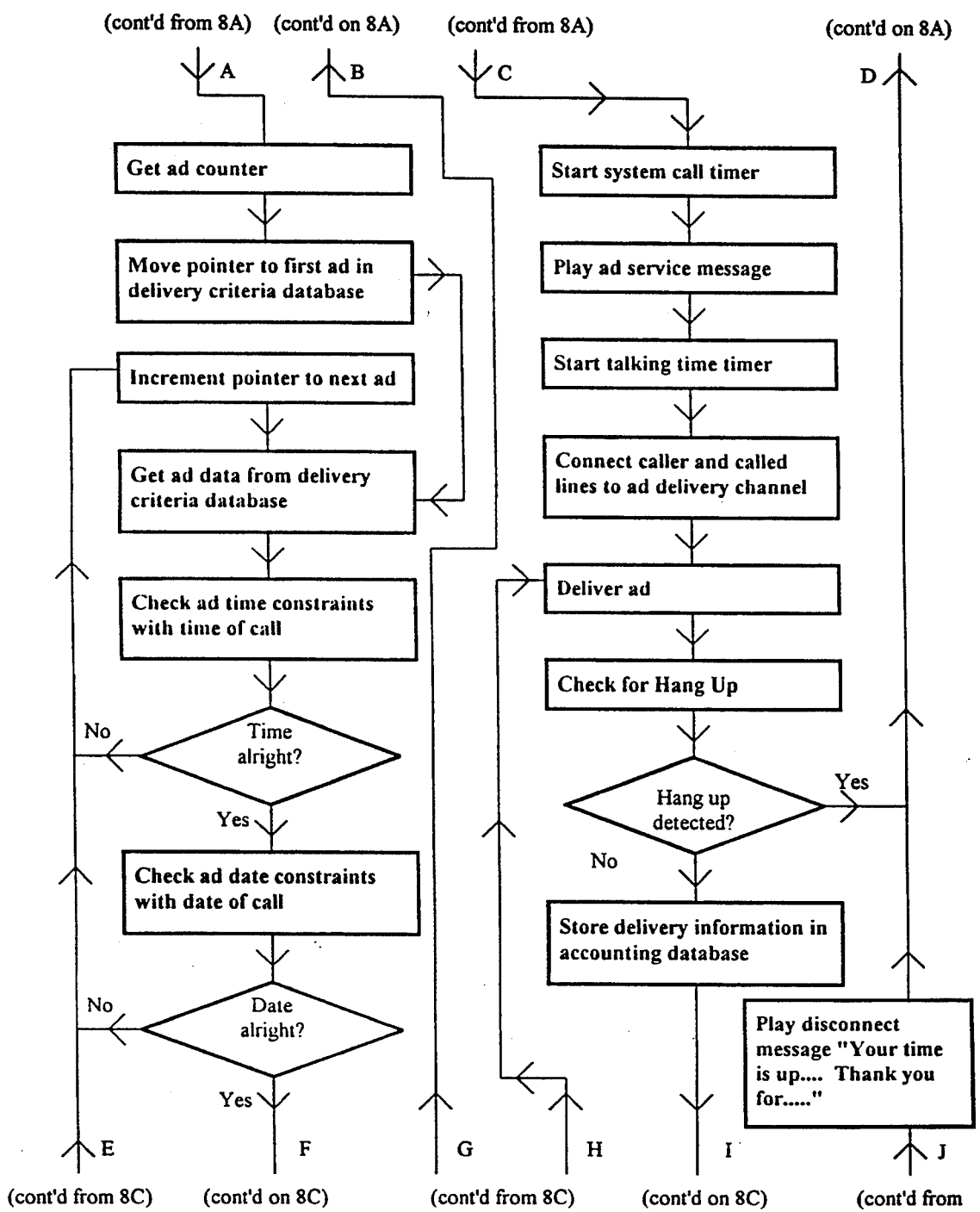
Figure 8C:
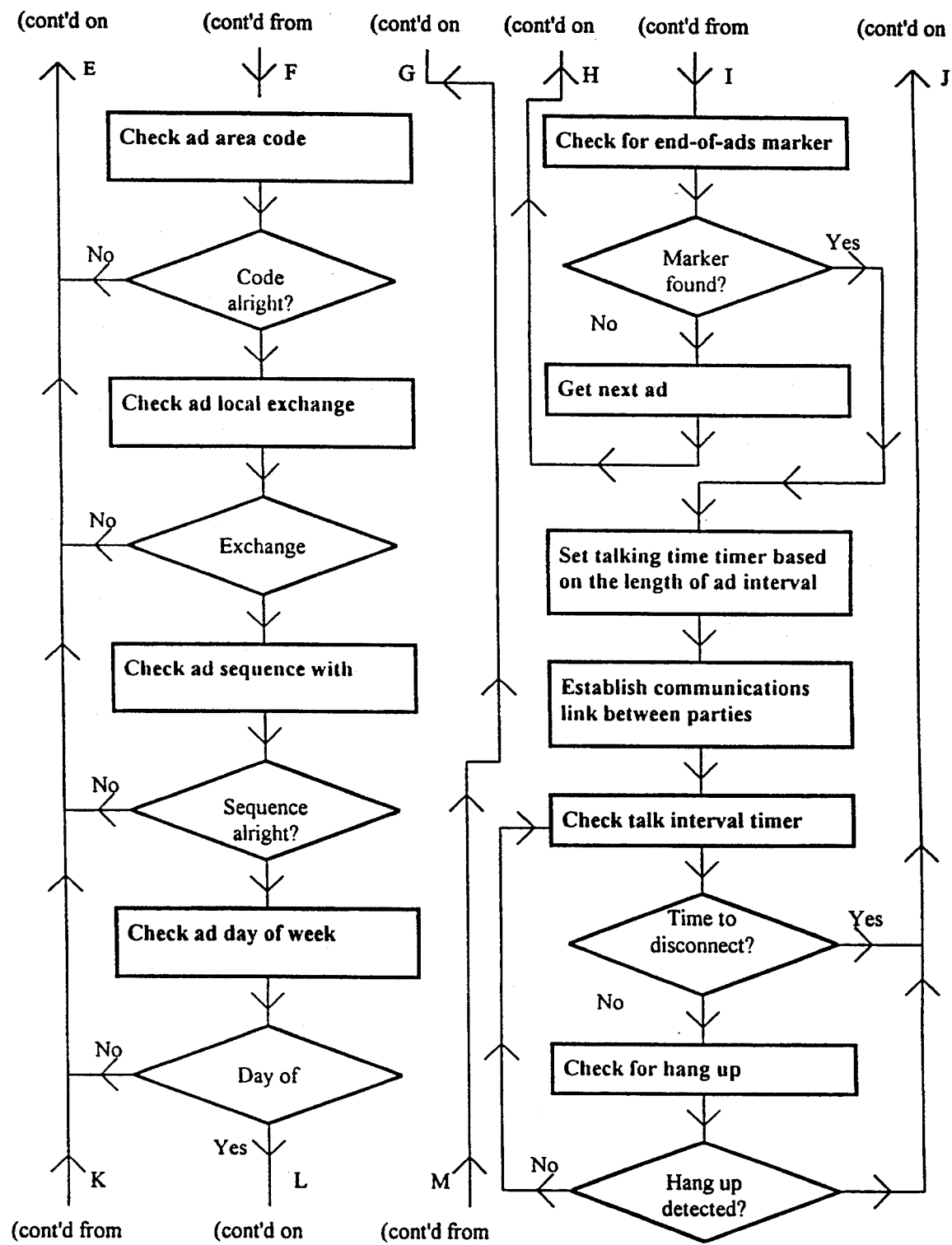
Figure 8D:
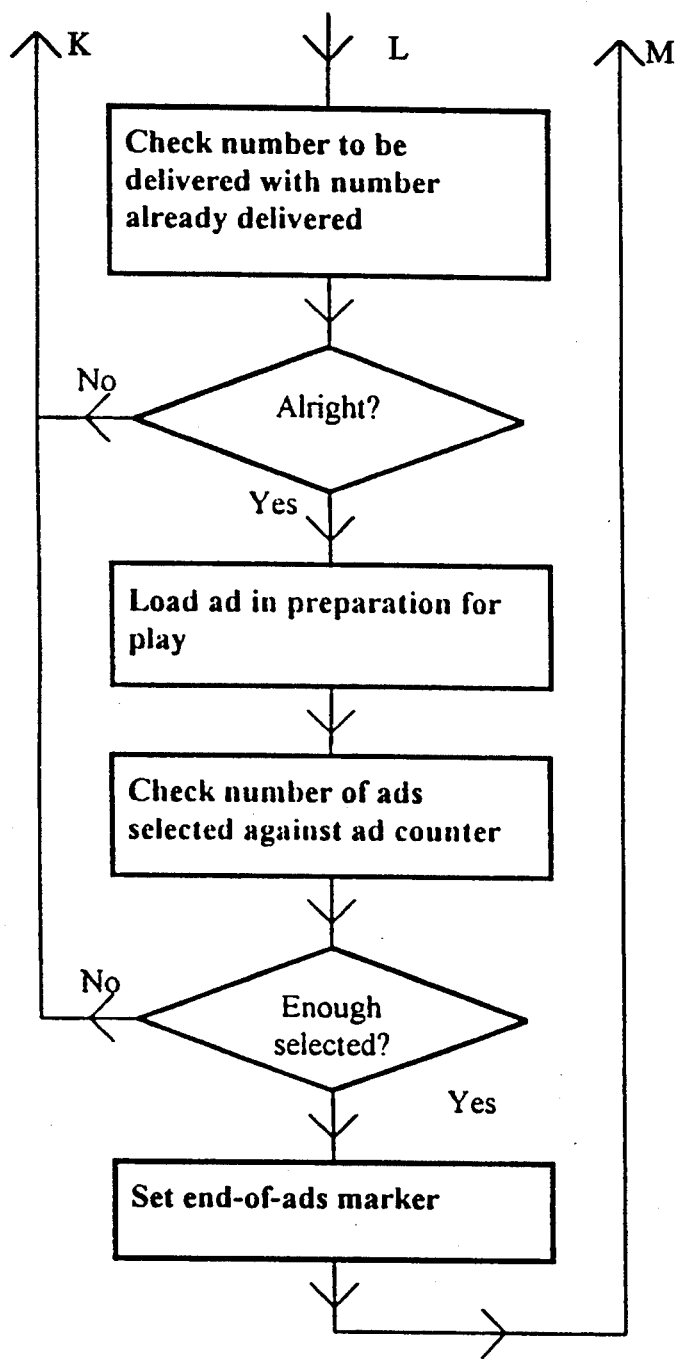

As in the block diagram of FIGS. 7A–7D, the ad service of FIGS. 8A–8C waits for incoming calls. When a call is detected, the ad service "answers" the call and gets the telephone number of the calling number from the line. The ad service checks to see if the telephone number of the called party is on the line in order to route the call. If there is no telephone number on the line, the ad service prompts the caller, "Please enter the number you want . . . ," and captures the digits that the caller enters on the telephone keypad.

The ad service then checks to see if the number is a valid area code and telephone number, able to be connected by the ad service. If it is not, a message is played, "I'm sorry . . . Your call cannot be completed . . . ," and the calling party is disconnected, and the ad service awaits a new call. If the number is valid, the ad service accesses the ad message delivery criteria database and gets the data for the first available ad message from the database (see FIG. 8B). First, the current time is checked against the times when the ad message is allowed to be delivered. If the ad message is not allowed to be delivered at the current time, the ad service gets the data for the next ad message from the database and starts checking again. The current date is checked against the dates when the ad message is allowed to be delivered. If the ad message is not allowed to be delivered on the current date, the ad service gets the data for the next ad message from the database and starts checking again. The area codes of the calling party and the called party are checked against the area codes where the ad message is allowed to be delivered. If the ad message is not allowed to be delivered in these area codes, the ad service gets the data for the next ad message from the database and starts checking again. The local exchanges of the calling party and the called party are checked against the local exchanges where the ad message is allowed to be delivered. If the ad message is not allowed to be delivered in these exchanges, the ad service gets the data for the next ad message from the database and starts checking again. The current ad message position number is checked against the ad message position numbers in which the ad message is allowed to be delivered (see FIG. 8D). If the ad message is not allowed to be delivered at the current ad message position, the ad service gets the data for the next ad message from the database and starts checking again. The current day of the week is checked against the days when the ad message is allowed to be delivered. If the ad message is not allowed to be delivered on the current day of the week, the ad service gets the data for the next ad message from the database and starts checking again. The number of times the ad message must be delivered is checked against the number of times the ad message has already been delivered. If the ad message has already been delivered a sufficient number of times (to satisfy an advertisement obligation, for example), the ad service gets the data for the next ad message from the database and starts checking again. When an ad message is selected, it is loaded into active memory in preparation for delivery on the call. The ad service then checks the ad counter to determine if enough ad messages have been selected for delivery during the one and only message interval on the call. If more ad messages are needed, the ad service continues to search through the database, selects ad messages and loads these ad messages in preparation for delivery on the call. When enough ad messages have been selected, the ad service stops searching the database and sets the end-of-ads marker.

The ad service then selects an outgoing line and routes the call to the telephone number of the called party designated by the caller. If the call is not answered, the ad service checks if the calling party has hung up. If the calling party has hung up, the ad service waits for a new call.

If the called party answers, an introductory message, such as "Thank you for using . . . Advertising messages will occasionally interrupt your call . . . ," is played optionally to one or both parties, after which the calling and the called parties are each connected to an advertising delivery channel and delivery of the selected ad message or messages is delivered. After delivery of each message, the ad service checks whether either party has hung up. If neither party has hung up, the ad message delivery data are stored in the ad message delivery database. The ad service checks for the presence of the end-of-ads marker to determine if there are more selected ad messages to be delivered and if so, delivers the selected ad messages.

After the end-of-ads marker has signified that the final ad message has been delivered, each party is disconnected from the advertising delivery channel. The ad service sets the talking time interval timer either to a fixed interval or to an interval that varies based on the length of the ad message or messages that was just delivered. The ad service checks to see if either party has hung up. The ad service connects the parties until the talking time interval has been exhausted or one or both of the parties hangs up. If there has been a hang up, the ad service awaits another call.

ADVERTISING SERVICE CONFIGURATION

The computer that comprises the core of the advertising service system in exemplary apparatus is an IBM AT compatible microcomputer with an Intel 386 microprocessor with the Microsoft MS-DOS version 5.0 operating system with added telephony and voice processing enhancements in the form of hardware and software. Referring to FIG. 2, the hardware enhancements include three expansion boards: a voice and tone processor 26, featuring digital signal processing hardware and firmware, and analog to digital converters, a telephone line interface 25, and a digital matrix switch 27. The software enhancements include the software drivers required for the expansion boards, plus a proprietary application program written in Microsoft C. All three expansion boards and software drivers are manufactured by Dialogic Corporation in Parsippany, N.J. The computer requires three empty full length expansion slots to accommodate the Dialogic expansion boards. Most IBM AT compatible computers with Intel 80386 or 80486 microprocessors can be used in this system. Some IBM AT compatible computers with Intel 80286 computers can also be used in this system.

The voice and tone processor 26 and related software are used to deliver the ad messages to the connected callers, to capture and generate tones for dialing, and to monitor events on the telephones line and determine the status of the calls.

The telephone line interface 25 is used to link the computer with the public switched telephone networks as well as private networks. The line interface in any particular configuration is either digital or analog. Analog and digital telephone line interfaces may be combined in a single computer.

The digital matrix switch 27 is used to connect the transmit and receive channels of incoming and outgoing lines to effect the switching of calls. The switch is optionally replaced by a crossover cable in digital line interface configurations.

In the computer, the telephone connection has separate receive and transmit channels connecting the calling and the called parties, that is, the transmit channel of the calling party is connected to the receive channel of the called party and the transmit channel of the called party is connected to the receive channel of the calling party. When the ad message is delivered, the computer "drops" the voice connection on each channel to the voice processing hardware. Optionally, the voice and the ad message on each channel are digitally "mixed" or combined in the computer in order to "conference" voices and the ad messages. Because, in this case, the two channels are separate, the ad messages transmitted on each channel may be the same or different. Optionally, true conferencing of the voices and ad messages is effected in the computer, possibly with the addition of telephone system hardware.

The central processing unit 31 controls the all call switching and routing as well as ad insertion and accounting.

The computer also requires a mass storage system 28, which is used to store the delivery criteria database 28a, the delivery accounting database 28b, the digitized ad messages and other programs and data needed to implement the function of the advertising service.

The advertising inserter and the ad service call router, while functionally distinct, both use the computer and telephone equipment contained in the advertising service. The advertising inserter and the ad service call router are distinguished by the computer software that controls the equipment with which they are implemented.

DELIVERY CRITERIA DATABASE STRUCTURE

The ad messages are stored in digital form on the computer along with a database that contains the delivery criteria relevant to each ad message. This database controls (a) when the ad message is allowed to be run, (b) how many times it must be run, (c) at what time(s) it is allowed to be run, (d) in what geographic area(s) it is allowed to be run, (e) if it must be run exclusive of other ad messages on a call and (f) in what sequence, if any, it must be run on a particular call. To accomplish this, the database contains the following information for each ad message: (a) Unique ad message ID number; (b) area codes that the ad message may or may not be delivered to; (c) telephone exchanges within area codes that the ad message may or may not be delivered to; (d) the times of day during which an ad message may or may not be delivered; (e) the days of the week on which an ad message may or may not be delivered; (f) the ordinal position that the ad message in a particular call may or may not appear; (g) the ad message numbers preceding and following the current ad message in a series on a call; (h) whether the ad message must be exclusive of other ad messages on a call; (i) length of the ad message.

To select an ad message for insertion into a connected telephone conversation, the system reads the delivery criteria from the database and compares it to the relevant information pertaining to the current call, as described previously.

DELIVERY ACCOUNTING DATABASE

The illustrated advertising service apparatus stores information pertaining to the delivery of each ad message for accounting purposes. This information includes (a) ad message identifier; (b) the calling number; (c) the called number; (b) the date the ad message was delivered; (e) the time the ad message was delivered; (f) the ordinal position of the ad message in the call. The total extent of delivery of each ad message over a period—days, weeks or longer—can be derived from such a data storage. However, the apparatus (FIG. 2) includes provisions for accruing the exposure of each ad, in terms of number of times each ad was delivered or the aggregate time elapsed during all the deliveries of each ad in the course of the accounting period.

ALTERNATIVE EMBODIMENTS OF THE SYSTEM

The described advertising service apparatus could operate in much the same fashion as described here if it consisted of components that are functionally similar to those described.

The computer that comprises the system is an AT-compatible microcomputer equipped with voice processing and telephone interface hardware and software, and proprietary software. Any other computer, including a workstation, minicomputer, mainframe, supercomputer or dedicated computer, equipped with voice and tone processing hardware and software could replace the AT-compatible microcomputer described herein. There are several other manufacturers of voice and tone processing, telephone network interface, and telephone switching expansion boards, such as Natural Microsystems and Rhetorex, as well as several manufacturers of functionally similar telephone system equipment, such as Rockwell and Fujitsu. Much of this hardware and software is readily available and that which must be constructed can be constructed out of readily available components and systems.

Furthermore, much of the computer processing and storage can be moved from the front end computer to a local are network (LAN) server to centralize ad message management, billing and accounting. The functions can be moved as modules, keeping as much processing as necessary in the front end computer. The computer processing and storage could be further moved to a mainframe or minicomputer.

The illustrated apparatus, using digital ad message storage and retrieval, could also be implemented using an analog system for ad message storage and retrieval with minor modification. The structure of the software would be basically the same.

The described advertising service apparatus, intended to be used with the public switched telephone network, including both local exchanges and long distance interexchange carriers, could also be used in any public or private telecommunication network.

The described apparatus, which is described in its application to two party calls, is readily extended to multiple party "conference" calls in a straightforward manner.

The communication between the parties and the transmitted ad messages may involve audio channels alone, or they may involve video transmissions with the audio signals.

As used in the description above of the novel advertising service apparatus, the term "ad message" includes messages not sponsored by advertisers and sponsored announcements of interest to the constituents, employees or members of a sponsor as well as customers and consumers.

What is claimed is:

1. A communication system having numerous telephones divided into at least three groups of telephones, and a system for connecting any of the telephones of any of said groups as a calling party to any of the telephones of any other one of said groups as the called party, said system including a local exchange for each of said groups of telephones and a long-distance network having a point-of-presence related to each of said local exchanges, the improvement wherein at least three ad service apparatuses are provided, a respective one of said ad service apparatuses being interposed between each of said local exchanges and the related point-of-presence in said long-distance network, one or more of said ad service apparatuses having ad insertion means for impressing ad messages on calls between said parties, and each of said ad service apparatuses including an ad service call router for routing a call from any one of said local exchanges to any other one of said local exchanges via said long-distance network along a channel that includes a said ad service apparatus which has an ad inserter.

2. A communication system as in claim 1 wherein the ad insertion means of each ad service apparatus having ad insertion means includes means for storing multiple messages and means for establishing, in alternating sequence, one mode of operation in which the parties are in communication with each other and a different mode of operation in which the communication between the parties is interrupted, said ad insertion means including means for selecting a message or multiple messages from said message storage means and means for impressing the selected message or messages sequentially on the telephone of at least one of said parties during said different mode of operation.

3. A communication system as in claim 1, wherein there are more ad service call routers than ad insertion means.

* * * * *